(12) United States Patent
Marx et al.

(10) Patent No.: US 8,950,301 B2
(45) Date of Patent: Feb. 10, 2015

(54) SKIVING TOOL COMPRISING CUTTER BARS

(75) Inventors: Hartmut Marx, Düsseldorf (DE); Olaf Vogel, Ettlingen (DE); Martin Zagromski, Wetter/Ruhr (DE)

(73) Assignee: Klingelnberg AG, Zurich (CH)

( * ) Notice: Subject to any disclaimer, the term of this patent is extended or adjusted under 35 U.S.C. 154(b) by 211 days.

(21) Appl. No.: 13/464,628

(22) Filed: May 4, 2012

(65) Prior Publication Data

US 2012/0282055 A1    Nov. 8, 2012

(30) Foreign Application Priority Data

May 6, 2011    (DE) .................... 20 2011 050 054 U

(51) Int. Cl.
| | |
|---|---|
| *B23B 5/16* | (2006.01) |
| *B23F 5/16* | (2006.01) |
| *B23F 21/10* | (2006.01) |
| *B23F 21/12* | (2006.01) |
| *B23B 1/00* | (2006.01) |

(52) U.S. Cl.
CPC .............. *B23F 5/163* (2013.01); *B23F 21/106* (2013.01); *B23F 21/128* (2013.01)
USPC ................................. 82/53; 407/20

(58) Field of Classification Search
USPC ..................... 407/67, 20, 27; 82/53
See application file for complete search history.

(56) References Cited

U.S. PATENT DOCUMENTS

| | | | | | |
|---|---|---|---|---|---|
| 1,634,494 | A | * | 7/1927 | Flinchbaugh ................ | 408/171 |
| 2,780,146 | A | * | 2/1957 | Saari ................................ | 409/31 |
| 3,259,729 | A | * | 7/1966 | Jensko et al. .................. | 219/68 |
| 3,354,528 | A | * | 11/1967 | Appleby ....................... | 408/228 |
| 3,509,612 | A | * | 5/1970 | Lankin ............................ | 407/38 |
| 4,060,881 | A | * | 12/1977 | Ryan et al. ..................... | 407/22 |
| 6,311,590 | B1 | * | 11/2001 | Stadtfeld ....................... | 82/1.11 |
| 7,736,099 | B2 | * | 6/2010 | Cole et al. ....................... | 407/66 |

FOREIGN PATENT DOCUMENTS

DE                243514             2/1912

* cited by examiner

*Primary Examiner* — Will Fridie, Jr.
(74) *Attorney, Agent, or Firm* — McCarter & English LLP

(57) ABSTRACT

A skiving tool for manufacturing a rotationally symmetrical periodical structure on a work piece by means of a power skiving method. The skiving tool comprises a base body comprising a central rotation axis and a plurality of receiving openings and a plurality of cutter bars, fewer than or equal to the number of receiving openings. Each of the receiving openings has an elongate shape having a longitudinal axis, and the receiving openings can be arranged uniformly around the central rotation axis. The longitudinal axes of the receiving openings are generators of a rotation hyperboloid, which is arranged rotationally symmetrical to the central rotation axis.

16 Claims, 20 Drawing Sheets

KE1  KE2

US 8,950,301 B2

SKIVING TOOL COMPRISING CUTTER BARS

CROSS-REFERENCE TO RELATED APPLICATION

This application claims priority under 35 U.S.C. §§119(a)-(d) to German Patent Application DE 202011050054.3, filed on May 6, 2011, which is hereby incorporated by reference in its entirety as part of the present disclosure.

FIELD OF THE INVENTION

The present invention relates to a skiving tool with cutter bars. The skiving tool is designed for manufacturing a rotationally symmetric, periodic structure on a work piece by means of a skiving method.

BACKGROUND OF THE INVENTION

There are numerous methods for manufacturing gear wheels. In chip-producing soft pre-machining, one distinguishes hobbing, gear shaping, generating planing and power skiving. Hobbing and power skiving are so-called "continuous" methods, as shall be explained further below.

In the chip-producing manufacturing of gear wheels, one distinguishes between the intermitted indexing process or single indexing process and the continuous method, which may also be called a continuous indexing process or face-hobbing.

In the continuous methods, for example, a tool comprising corresponding cutters is used to cut the flanks of a work piece. The work piece is cut as required in one continuous clamp, i.e., in an uninterrupted process. The continuous method is based on complex coupled movement sequences, in which the tool and the work piece to be machined perform a continuous indexing movement relative to each other. The indexing movement results from the driving in coordination with coupled driving of plural axle drives of a corresponding machine.

In the single indexing process, one tooth gap is machined, then, for example, a relative movement of the tool occurs, a so-called "indexing" movement (indexing rotation), in which the work piece rotates relative to the tool, and then the next tooth gap is machined. In this process, a gear wheel is manufactured step by step.

The initially mentioned gear shaping method may be described or represented by a cylinder gear transmission, because the intersection angle between the rotation axis R1 of the shaping tool 1 and the rotation axis R2 of the work piece 2 amounts to zero degree, as represented schematically in FIG. 1. The two rotation axes R1 and R2 run parallel when the intersection angle amounts to zero degree. The work piece 2 and the shaping tool 1 rotate continuously about their rotation axes R2 and R1, respectively. In addition to the rotational movement, the shaping tool 1 carries out a stroke movement, which is referenced in FIG. 1 by the double arrow $s_{hx}$, and removes chips from the work piece 2 during this stroke movement.

A skiving process was developed many years ago, the basics of which are approximately 100 years old. An early patent application on this subject, DE 243514, dates back to 1912. After the initial considerations and investigations, skiving was no longer seriously pursued further. Previously, complex processes, which were partly empirical, were necessary in order to find a suitable tool geometry for the skiving process.

In the 1980s, power skiving was developed. However, it was not until present-day simulation methods and modern machine CNC-controls, that the principle of power skiving could be implemented as a productive, reproducible and robust method. The high durability of present-day tool materials, the enormous high static and dynamical rigidity, and the high performance of the synchronous running of the modern machines now also aid the process.

In the skiving process, as shown in FIG. 2, there is an intersection angle (also called intersection angle of axes) Σ between the rotation axis R1 of the skiving tool 10 (also called a skiving wheel) and the rotation axis R2 of the work piece 20, which is different from zero. The resulting relative movement between the skiving tool 10 and the work piece 20 is a helical movement, which can be decomposed into a rotational portion (rotatory portion) and an advance portion (translational portion). A generation helical type gear transmission can be considered as a drive technology-specific analogon, wherein the rotational portion corresponds to the rolling and the advance portion corresponds to the gliding of the flanks. The greater the absolute value of the intersection angle Σ, the more the translational movement portion required for the machining of the work piece 20 increases. It causes namely a movement component of the cutting edges of the skiving tool 10 in the direction of the tooth flanks of the work piece 20. Thus, during power skiving, the gliding portion of the combing relative movement of the mutually engaging gear wheels of the equivalent helical gear is utilized to carry out the cutting movement. In power skiving, only a slow axial feed (also called axial feed) is required and the so-called shaping, or pushing, movement, which is typical for the gear shaping, is dispensed with. Thus, a return stroke movement also does not occur in power skiving.

The cutting speed during skiving is influenced directly by the rotational speed of the skiving tool 10 with respect to the work piece 20 and the utilized intersection angle Σ between the rotation axes R1 and R2. The intersection angle Σ and thus the gliding portion should be selected such that for a given rotational speed an optimum cutting speed is achieved for the machining of the material.

The skiving process is not utilized solely for the machining of outer toothings, as shown, e.g., in FIG. 2. When manufacturing inner toothings, skiving is significantly more productive than gear shaping or broaching, which have been used thus far.

Skiving can be utilized both in pre-toothing prior to heat treatment of the work piece 20 and in finishing-toothing after heat treatment. That is, skiving is suitable both for soft machining and for hard (fine) machining.

The movement sequences and further details of an established skiving process can be taken from the schematic representation in FIG. 2 that has already been mentioned. FIG. 2 shows skiving of an outer toothing on a cylindrical work piece 20, where the work piece 20 and the tool 10 (here a cylindrical skiving tool 10) rotate in opposite directions.

Additional relative movements also occur. An axial feed $s_{ax}$ is required in order to machine the entire toothing width of the work piece 20 with the tool 10. If helical toothing is desired on the work piece 20 (i.e. $\beta_2 \neq 0$), a differential feed $s_D$ is superimposed onto the axial feed $s_{ax}$. A radial feed $s_D$ may be carried out as a lining movement. The radial feed $s_{rad}$ may also be employed in order to influence the convexity of the toothing of the work piece 20.

In skiving, the vector of the cutting speed $v_c$ results substantially as the difference of the two velocity vectors $v_o$ and $v_2$ of the rotation axes R1, R2 of the tool 10 and the work piece 20. The velocity vectors are tilted with respect to each other by the intersection angle $\Sigma$. The symbol $v_o$ is the velocity vector at the periphery of the tool 10 and $v_2$ is the velocity vector at the periphery of the work piece 20. The cutting speed $v_c$ of the skiving process may thus be changed by the intersection angle $\Sigma$ and/or the rotation speed in the equivalent helical gear. The axial feed $s_{ax}$ has only a small influence on the cutting speed $v_c$, which can be neglected and is thus not shown in the vector diagram comprising the vectors $v_o$, $v_2$ and $v_c$ in FIG. 2.

The skiving of an outer toothing of a work piece 20 using a conical skiving tool 10 is shown in FIG. 3. In FIG. 3 again, the intersection angle $\Sigma$, the cutting speed $v_c$, the velocity vectors $v_o$ at the periphery of the tool 10 and $v_2$ at the periphery of the work piece 20 as well as the inclination angle $\beta_0$ of the tool 10 and the inclination angle $\beta_2$ of the work piece 20 is shown. Here, in contrast to FIG. 2, the inclination angle $\beta_2$ is different from zero. The two rotation axes R1 and R2 do not intersect, but are arranged skewed with respect to each other. For a conical skiving tool 10, the calculation point AP is usually chosen on the joint plumb of the two rotation axes R1 and R2, because tilting of the skiving tool 10 to provide end relief angles is not necessary. The calculation point AP coincides with the so-called "contact" point. The rolling circles of the equivalent helical generation gear contact each other at the calculation point AP.

In skiving, a tool 10 comes to application, which comprises at least one geometrically determined cutting edge. The cutting edge/cutting edges are not shown in FIG. 2 and FIG. 3.

The tool is of great importance in skiving. In the example shown in FIG. 2, the skiving tool 10 has the shape of a spur-toothed spur wheel. The outer contour of the base body in FIG. 2 is cylindrical. However, it can also be tapered (also called conical), as shown in FIG. 3. Because the tooth, or teeth, of the skiving tool 10 engages along the entire length of the cutting edge, each tooth of the tool 10 requires a sufficient end relief angle at the cutting edge.

An example of a single cutting tooth 3 of a straight-toothed conical skiving tool 10 is shown in FIG. 4A. The following statements also hold for helically toothed conical skiving tools 10. When starting from a conical skiving tool 10, it is obvious that the relief angle at the tooth head 4 (called the "head relief angle") and at the tooth flank (called the "flank relief angle") directly results from the shape of the cutting tooth 3. When considering a displacement from the tooth breast 5 in an axial direction, i.e., in the direction of R2, then the profile height steadily falls off. That is, the cutting tooth 3 gets progressively smaller along the axial direction. In FIG. 4A, the tooth breast 5 is in the lowest horizontal plane of the cutting tooth 3 and is therefore not visible. FIG. 4B shows a section B-B of the cutting tooth 3 where the tooth breast 5 is visible.

In the frontal regrinding of a conical skiving tool 10, the diameter of the head circle gets smaller. FIG. 4C shows a state after the regrinding in a schematic representation. The original shape of the cutting tooth 3 is characterized by the tooth breast 5 and the tooth head 4. The shape of the cutting tooth 3 after regrinding is characterized by the tooth breast 5' and the tooth head 4'. The machine settings must be adapted after regrinding due to the resulting lowering of the diameter to the head circle.

When starting from a straight-toothed or a helically toothed cylindrical skiving tool 10, it is recognized that such a skiving tool 10 does not have so-called "constructional" relief angles, neither at the head nor at the flanks. If such a cylindrical skiving tool 10 is clamped in the conventional manner, there is no relief angle. Kinematic relief angles can be generated by tilting the skiving tool 10. In practice, tilting of the skiving tool 10 is achieved by an eccentric clamping of the skiving tool 10 in the machine, in order to offset the cutting face from the intersection point of axes (called cutting face offset). The contact point of the rolling circles of the skiving tool 10 and the work piece 20 no longer lies on the joint plumb of the rotation axes R1 and R2. The further the skiving tool 10 is tilted, the larger the effective relief angle becomes.

One problem that arises is that the life of known skiving tools 10 is partly unsatisfactory. If one of the cutting teeth 3 is excessively worn out or even damaged by an improper relative movement of the skiving tool 10 with respect to the work piece 20, then the manufacturing process must be interrupted and the skiving tool 10 exchanged. Such interruptions have a negative impact on productivity. In addition, tool cost increases when the skiving tool 10 must be reground or even exchanged.

It is a concern, then, to keep the cost of tools as low as possible by improving the lifetime of the tools.

SUMMARY OF THE INVENTION

It is an object of the present invention to provide a tool for the cutting machining of the tooth flanks of a tooth wheel or another periodic structure, which is robust and adaptable. Increase in the life of the tool and reduction of manufacturing cost per tooth wheel or per work piece is also an objective of the present invention. This object is solved by a tool according to the present invention, which is herein called a "skiving" tool. The proposed tool shall be suitable for use in series production, for example, in the automotive industry.

In one aspect, a skiving tool is provided for manufacturing a rotation-symmetry periodical structure on a work piece by means of the skiving method. In some embodiments, the skiving tool comprises a base body comprising a central rotation axis and a plurality of receiving openings. The skiving tool further comprises a plurality of cutter bars, less than or equal to the plurality of receiving openings. Each of the receiving openings has an elongate shape having a longitudinal axis, and all the receiving openings are uniformly arranged around the central rotation axis. The longitudinal axes of the receiving openings generate a rotation hyperboloid, which is rotation-symmetric to the central rotation axis. In some embodiments, the longitudinal axes of the receiving openings are further apart in an area of an end piece of the base body than in a rear section of the base body closer to the machine.

In some embodiments, the skiving tools are define a so-called "intersection angle" of longitudinal axes. In some embodiments, the intersection angle is within the range of about −45 degrees and about 45 degree. In some such embodiments, the intersection angle is within the range of about −40 degrees and about 40 degrees.

In some embodiments, the longitudinal axes of the receiving openings are closer to each other at the end piece of the base body than at the rear section of the base body closer to the machine.

In some embodiments, all of the longitudinal axes of the receiving openings lie parallel to each other and are arranged concentrically about the central rotation axis of the skiving tool.

In some embodiments, the base body is formed of a cylindrical and at least one truncated-cone-shaped body, wherein the truncated-cone-shaped body is located on the side facing the work piece during power skiving. The cylindrical body sits preferably in the rear section of the base body closer to the machine.

In some embodiments, the base body is formed solely of at least one truncated-cone-shaped body.

A truncated cone is a rotational body, which is defined by a cover face on the one side and a base on the opposite side. The cover face of the truncated-cone-shaped base body forms the front face of the end piece, and the base corresponds either to the connection surface for connection with a tool spindle or for connection with an adapter, if present, or for connection with a cylindrical body, if present.

The longitudinal axes of the cutter bars serve as the generators of the rotation hyperboloid. The configuration of the cutter bars may thus be described by a rotation hyperboloid, a truncated cone, or a cylinder.

In the case of a rotation-hyperboloid-shaped or truncated-cone-shaped constellation of the cutter bars, directly adjacent receiving openings have, in a section of the end piece, a minimum distance greater than the minimum distance in a rear area of the base body.

Directly adjacent receiving openings are separated from each other by material of the base body, where, in the case of a rotation-hyperboloid-shaped or a truncated-cone-shaped constellation of the cutter bars, the material between two directly adjacent receiving openings in the rear area of the base body have a smaller material strength than in the area of the end piece.

In some embodiments, active head sections of the cutter bars project frontally or out of the truncated-cone-shaped section of the base body of the skiving tool.

The skiving tools are designed for the skiving of rotation-symmetric periodic structures on work pieces, as described further below. The skiving process described relates to a continuous cutting method. The process relates to a rolling method or a continuous rolling toothing method.

In some embodiments, the cutting edge chip surfaces of the skiving tools are arranged in parallel planes. In some such embodiments, the chip surfaces lie on a cone surface (also called "cone reference surface"), whereby they may be tilted for improving local chipping with respect to the cone reference surface.

In some embodiments, the skiving tools are cutter head tools that have a base body equipped with cutter inserts. In some such embodiments, the cutter inserts are bar cutters.

In some embodiments, the skiving tools have a constructive relief angle provided according to the geometry of the skiving tool.

The invention may be applied in components, which have a so-called "fitting interfering contour" (e.g. a collision flank) and which therefore cannot be manufactured with a hobbing method in most cases.

The skiving tools may be utilized for both dry and wet machining.

The application spectrum for skiving is large and extends to the manufacturing of rotation-symmetric periodical structures. The skiving tool of the present invention is not only useful for the manufacture of hobbable toothings, but also for the manufacture of other periodically repeating structures which are not hobbable. The described and claimed power skiving may be applied for example in the manufacture of products which have been manufactured thus far by gear shaping.

The skiving tools of the present invention also enable high material cutting rates. Additionally, favorable surface structures can be achieved on tooth flanks and other machined surfaces. The machining traces run obliquely across the machined surfaces, which only emits a low noise level during operation, for example, in machining transmission gear elements.

When skiving with a skiving tool according to the present invention, material is cut continuously on the work piece, until the teeth or the other periodic structures are formed completely.

Skiving using a skiving tool according to the present invention is of high performance, which has significant potential in machining time. In addition to the fast cycle times, tool cost is relatively low. All these aspects contribute to the particular cost effectiveness of skiving with the skiving tools of the present invention.

DETAILED DESCRIPTION OF THE INVENTION

In the present description, terms are used which also find use in relevant publications and patents. It is noted however, that the use of these terms shall merely serve a better comprehension. The inventive idea and the scope of the claims shall not be limited in their interpretation by the specific selection of the terms. The invention can be transferred without further ado to other systems of terminology and/or technical areas. In other technical areas, the terms are to be employed analogously.

Rotational-symmetric periodic structures are, for example, gear wheels having an inner and/or outer toothing. However, for example, brake discs, clutch or gear transmission elements, etc., may also be implied. The skiving tools are particularly suitable for the manufacturing of pinion shafts, worms, ring gears, toothed wheel pumps, ring joint hubs (ring joints are employed, for example, in the motor vehicle sector for transmitting the force from a differential gear to a vehicle wheel), spline shaft joints, sliding collars, belt pulleys, etc. Herein, the periodic structures are also called periodically repeating structures.

In the following, mention is made primarily to gear wheels, teeth and tooth gaps. However, as mentioned above, the invention can also be implemented to other construction parts with other periodic structures. Such other construction parts do not concern tooth gaps, but, for example, grooves or channels.

Figure 5A:
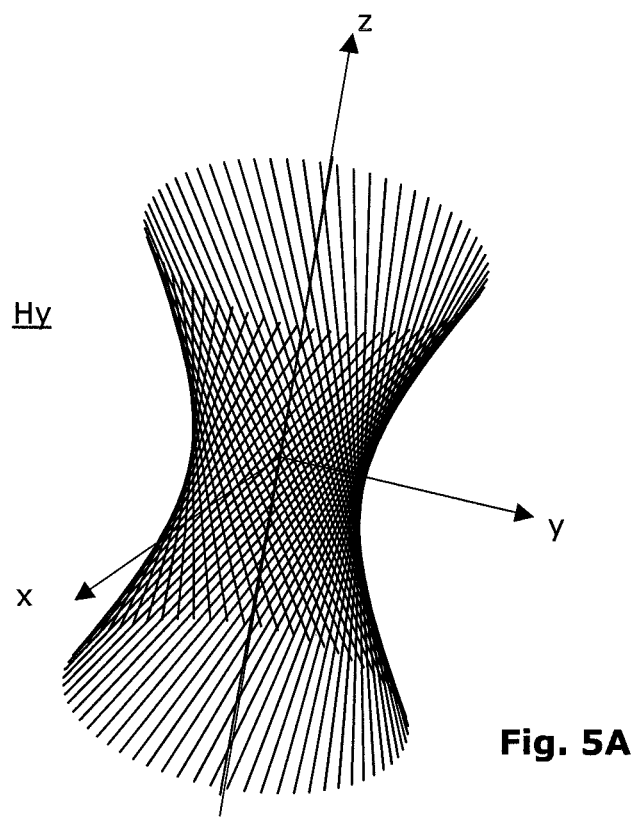
FIG. 5A is a perspective view of a rotation hyperboloid.

A rotational hyperboloid Hy (also called rotation hyperboloid), as shown in FIG. 5A, is a type of a single-shell hyperboloid. A rotation hyperboloid Hy defines a surface of second order, which is generated by rotating a straight line (also called generator) about a straight line (rotation axis) that is skew with respect to it. In FIG. 5A, the rotation axis coincides with the z-axis. The term "the generator of a single-shell rotational hyperboloid Hy" is understood to refer to a straight line, the rotation of which generates a single shell rotation hyperboloid Hy. The reference surface for the arrangement of the cutter shafts of the cutter bars 120 of the skiving tools 100 according to the invention relates to a rotation hyperboloid Hy.

Figure 5B:
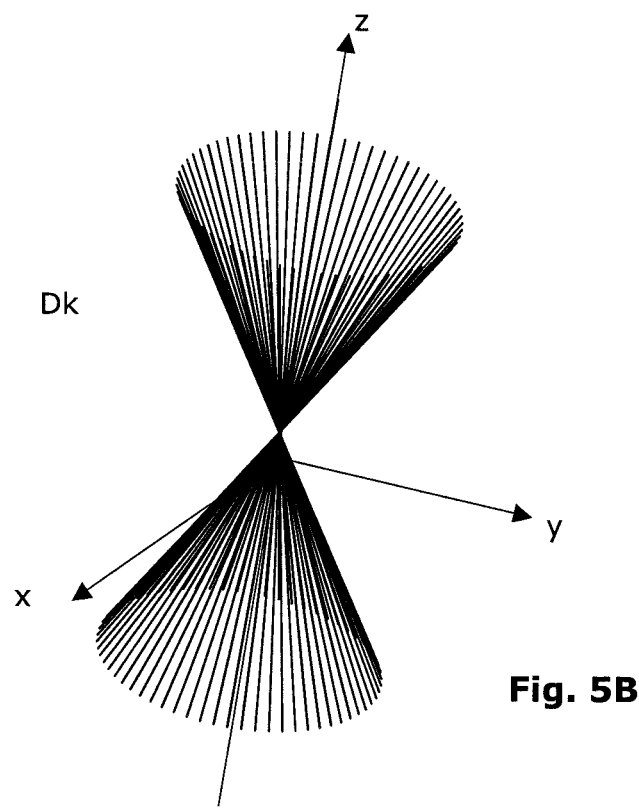
FIG. 5B is a perspective view of a double cone.
Figure 5C:
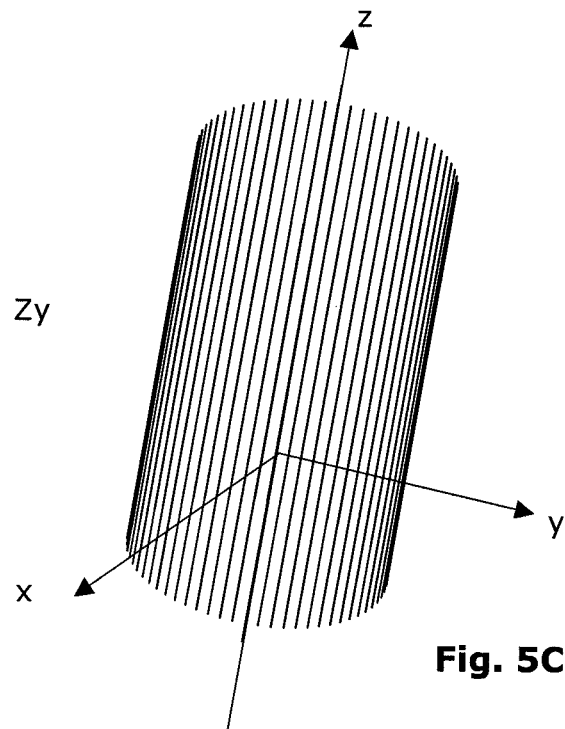
FIG. 5C is a perspective view of a cylinder.

If the generating straight line intersects the rotation axis (the z-axis), then the rotation hyperboloid Hy degenerates into a double cone Dk, as shown in FIG. 5B. If the generating straight line is parallel to the rotation axis, then the rotation hyperboloid Hy degenerates into a cylinder Zy, as shown in FIG. 5C.

In some embodiments of the skiving tool 100, the longitudinal axes of the receiving openings 111 and the cutter shafts of the cutter bars 120 form generators of a rotation hyperboloid Hy. Thus, it can also be said, that the longitudinal axes represent the generators. A corresponding number of receiving openings 111 is uniformly distributed about the rotation axis.

In the design of the tool, the generator is chosen such that (1) a good regrindability of the cutter bars 120 is achieved (inclination angle respectively helix angle alphaH), and (2) prevention of collision with cutter bar shafts as long as possible is achieved, whereby the grindability of the cutter bars 120 must be taken into account (cone angle alphaC, which is herein also called $\alpha_C$).

Several examples for possible constellations of the cutter bars 120 are shown in FIGS. 6A-6F. These examples can be applied to various embodiments of the invention. The related numerical data provided is exemplary.

Figure 6A:
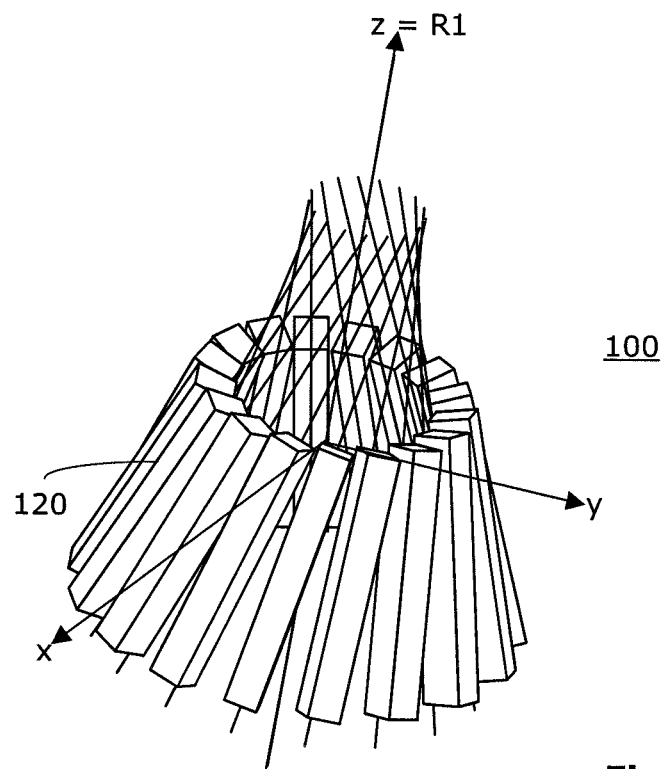
FIG. 6A is a top oblique perspective view of an embodiment of a skiving tool where the cutter bars are arranged in the constellation of a rotating hyperboloid tapering to the rear.

FIG. 6A shows an embodiment of a skiving tool 100 in a perspective view obliquely from above, wherein the cutter bars 120 are arranged in the constellation of a rotation hyperboloid, which tapers rearward (i.e. in the direction of the machine). Here, the skiving tool 100 comprises 17 cutter bars. AlphaA=4.5 degrees (herein also called $\alpha_A$), alphaH=8.8 degrees (herein also called $\alpha_H$), and alphaC=20 degrees (herein also called $\alpha_C$). The rotation axis coincides with the rotation axis R1 of the tool 100.

Figure 6B:
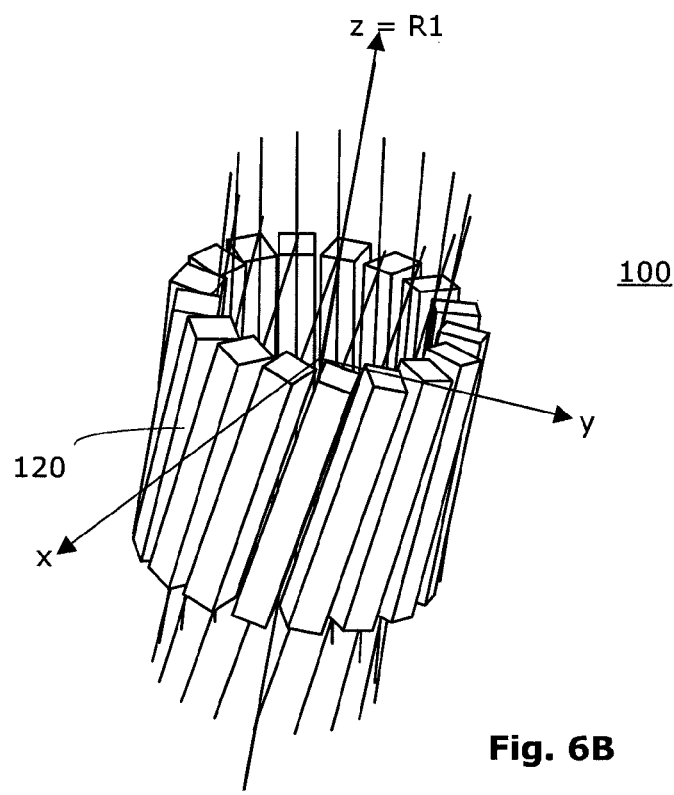
FIG. 6B is a top oblique perspective view of an embodiment of a skiving tool where the cutter bars are arranged in the constellation of a rotation hyperboloid in the section of the waist.

FIG. 6B shows an embodiment of a skiving tool 100 in a perspective view obliquely from above, wherein the cutter bars 100 are arranged in the constellation of a rotation hyperboloid in the area of the waist. Here, the skiving tool 100 comprises 17 cutter bars, alphaA=4.5 degrees, alphaH=8.8 degrees, and alphaC=0 degrees. The rotation axis coincides with the rotation axis R1 of the tool 100.

Figure 6C:
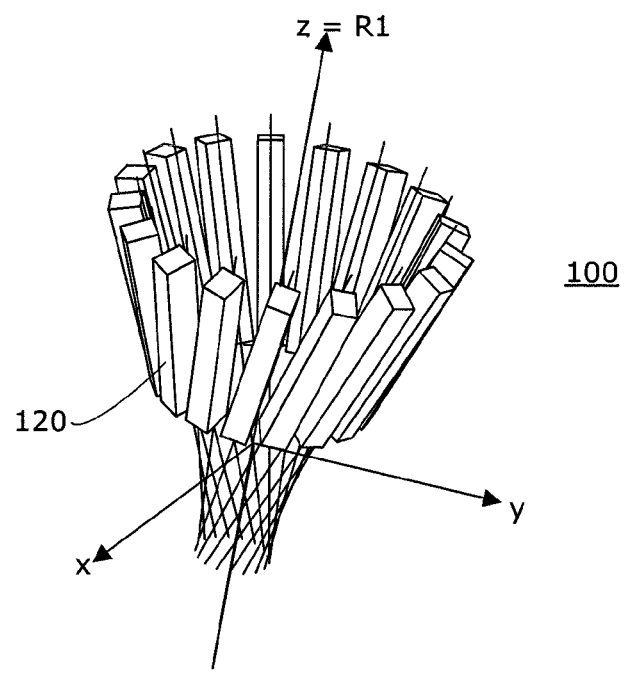
FIG. 6C is a top oblique perspective view of an embodiment of a skiving tool where the cutter bars are arranged in the constellation of a rotation hyperboloid tapering forward.

FIG. 6C shows an embodiment of a skiving tool 100 in a perspective view obliquely from above, wherein the cutter bars 120 are arranged in the constellation of a rotation hyperboloid, which tapers forwardly (i.e. in the direction of the work piece). Here, the skiving tool 100 comprises 17 cutter bars, alphaA=4.5 degrees, alphaH=8.8 degrees, and alphaC=−20 degrees. The rotation axis coincides with the rotation axis R1 of the tool 100.

Figure 6D:
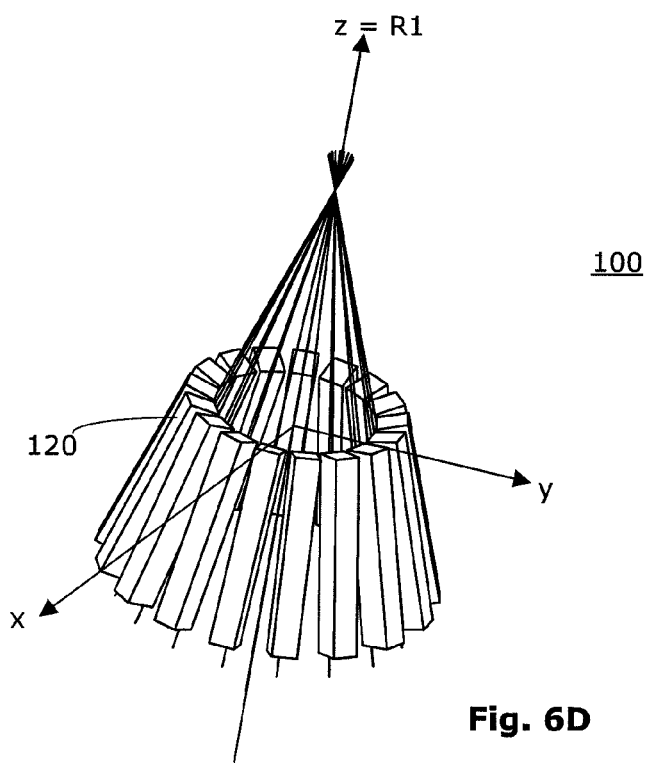
FIG. 6D is a top oblique perspective view of an embodiment of a skiving tool where the cutter bars are arranged in a rotation hyperboloid degenerated to a cone tapering rearward.

FIG. 6D shows an embodiment of a skiving tool 100 in a perspective view obliquely from above, wherein the cutter bars 120 are arranged in the constellation of a rotation hyperboloid degenerated to a cone and wherein the cone tapers rearward (i.e. in the direction of the machine). Here, the skiving tool 100 comprises 17 cutter bars, alphaA=0 degrees, alphaH=0 degrees, and alphaC=17.8 degrees. The rotation axis coincides with the rotation axis R1 of the tool 100.

Figure 6E:
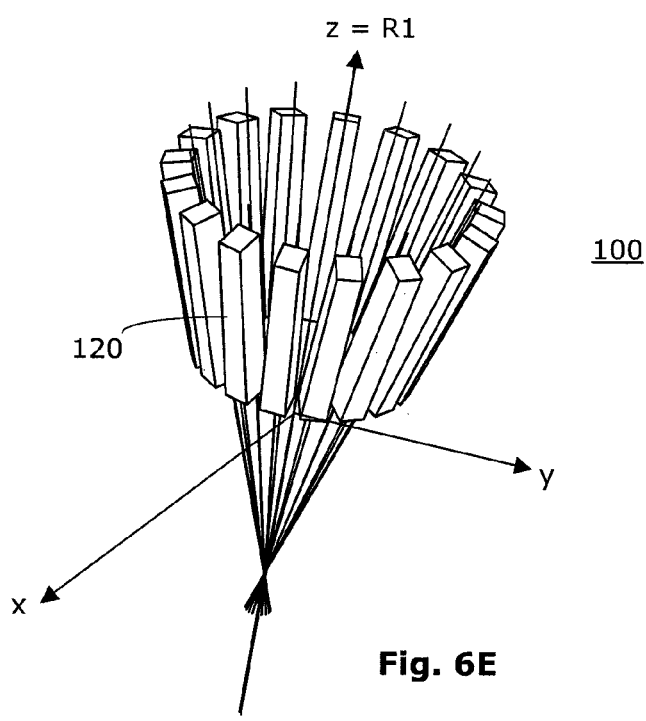
FIG. 6E is a top oblique perspective view of an embodiment of a skiving tool where the cutter bars are arranged in the constellation of a rotation hyperboloid degenerated to a cone tapering forward.

FIG. 6E shows an embodiment of a skiving tool 100 in a perspective view obliquely from above, wherein the cutter bars 120 are arranged in the constellation of a rotation hyperboloid degenerated to a cone, wherein the cone tapers forwardly (i.e. in the direction of the work piece). Here, the skiving tool 100 comprises 17 cutter bars, alphaA=0 degrees, alphaH=0 degrees, and alphaC=−17.8 degree. The rotation axis coincides with the rotation axis R1 of the tool 100.

Figure 6F:
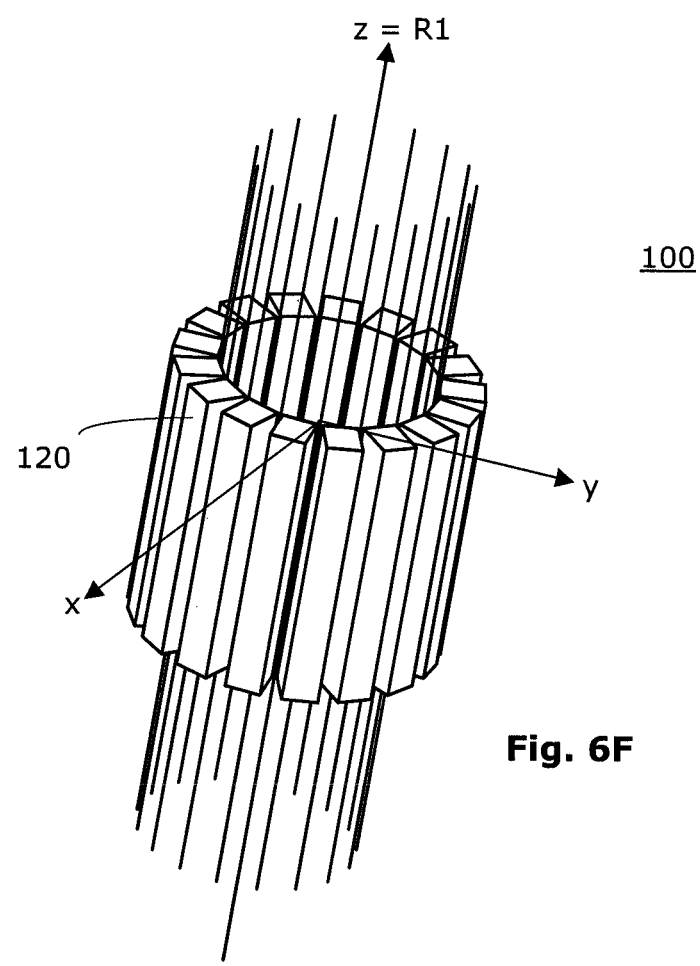
FIG. 6F is a top oblique perspective view of an embodiment of a skiving tool where the cutter bars are arranged in the constellation of a rotation hyperboloid degenerated to a cylinder.

FIG. 6F shows an exemplary embodiment of a skiving tool 100 in a perspective view, obliquely from above, wherein the cutter bars 120 are arranged in the constellation of a rotation hyperboloid degenerated to a cylinder. Here, the skiving tool 100 comprises 17 cutter bars, alphaA=0 degrees, alphaH=0 degrees, and alphaC=0 degrees. The rotation axis coincides with the rotation axis R1 of the skiving tool 100.

Figure 7:
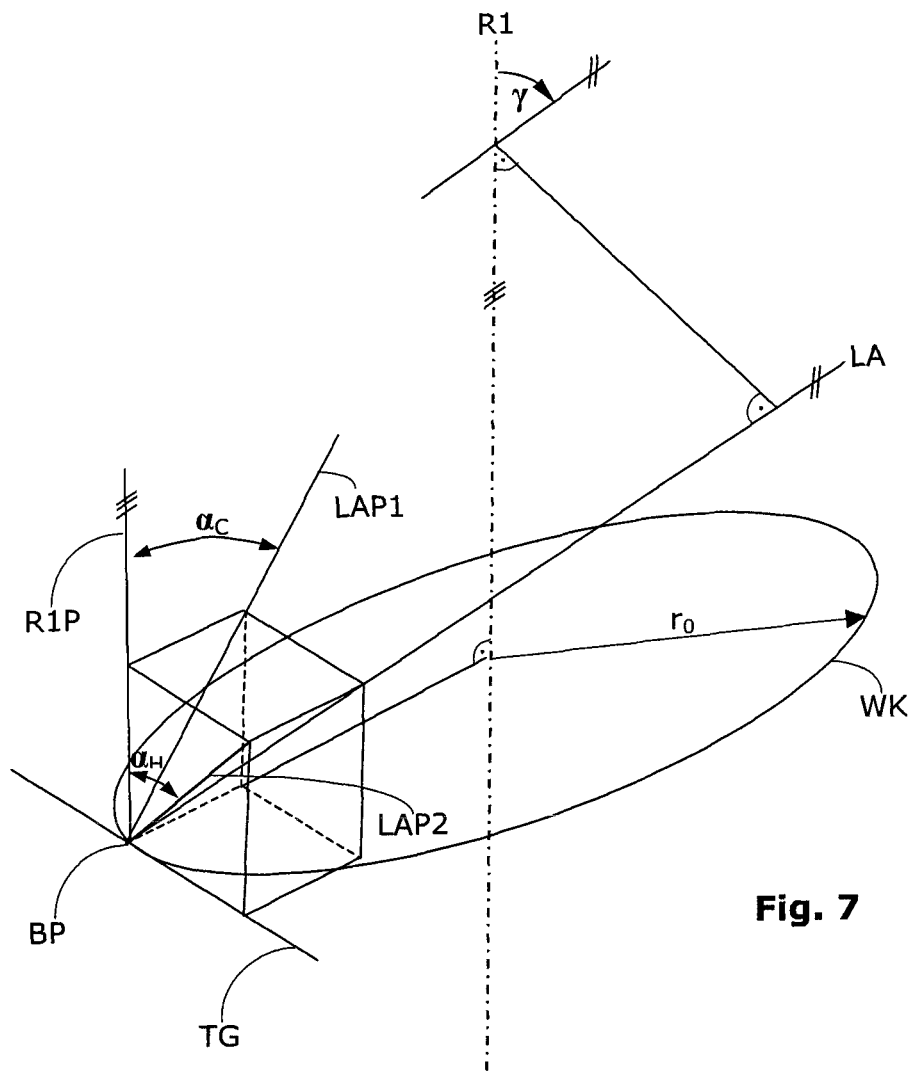
FIG. 7 shows geometrical correlations to the spatial position of the longitudinal axes of the cutter bars with respect to the receiving openings for the cutter bars.

FIG. 7 shows geometrical correlations of the spatial position of the longitudinal axes LB of the cutter bars 120 with respect to the longitudinal axes LA of the receiving openings 111 for the cutter bars 120.

With respect to the angles alphaC and alphaH, a reference point BP on the generator of the rotation hyperboloid Hy is required because the angles alphaC and alphaH vary, when the considered point moves along the generator.

In the following considerations, the following system is applied as the reference system:

In the skiving, there are respective rolling circles for the work piece 20 and the skiving tool 100. The rolling circle WK of the skiving tool 100, having a radius r0, can be taken as the reference circle, as shown in FIG. 7.

This reference circle lies in a plane, which shall be called the reference plane.

The reference point BP for a longitudinal axis LA is the piercing point of the longitudinal axis LA through the mentioned reference plane. The reference point BP lies on the reference circle, respectively, on the rolling circle WK.

The reference plane divides the 3-dimensional space in two halves. The reference half space shall be the side, in which the skiving tool 100 extends substantially. That is, the receiving openings 111 for the cutter shafts of the cutter bars 120 shall be arranged in this reference half space. However, they may project into the other half space.

An orthogonal reference system is also applied, as shown in FIG. 7. The orthogonal reference system is set with respect to the reference point BP and is defined as follows:

The reference point BP and the rotation axis R1 of the tool 100 define a plane, which is called the cone angle definition plane.

A parallel straight line R1P can be drawn through the reference point BP parallel to the rotation axis R1 of the tool 100, which is called the reference straight line R1P.

In reference to point BP, a line TG can be drawn tangent to the reference circle, respectively, the rolling circle WK, which tangent lies in the reference plane. This tangent line TG together with the reference straight line R1P span a plane, which shall be called the helix angle definition plane.

The helix angle definition plane and the cone angle definition plane stand perpendicular to each other.

In this system, the cone angle alphaC and the helix angle alphaH will be defined as follows.

The cone angle alphaC is defined as the angle between the longitudinal axis LAP1 projected into the cone angle definition plane and the reference straight line R1P. The cone angle alphaC is positive, if the projected rotational axis LAP1 intersects the rotation axis R1 in the reference half space.

The helix angle alphaH is the angle between the longitudinal axis LAP2 projected into the helix angle definition plane and the reference straight line R1P. The helix angle alphaH is positive, if the projected longitudinal axis LAP2 is rising to the right with respect to the rotation axis R1.

On the basis of the system described in relation with FIG. 7, a so-called "intersection angle" γ (gamma) of longitudinal axis can be defined as follows:

The intersection angle γ (gamma) of longitudinal axes is the smaller one of the two intersection angles enclosed by the longitudinal axis LA and the rotation axis R1. It can be defined, according to the following equation:

$$\cos \gamma = \frac{1}{\sqrt{1 + \tan^2 \alpha_c + \tan^2 \alpha_H}}.$$

At alphaH=0, the intersection angle γ (gamma) of the longitudinal axes degenerates to an intersection angle.

According to an embodiment, the intersection angle γ (gamma) of the longitudinal axes may be within the range of about −45 degrees and about 45 degrees. The intersection angle γ (gamma) of the longitudinal axes may also be within the range of about −40 degrees and about 40 degrees.

Figure 8A:
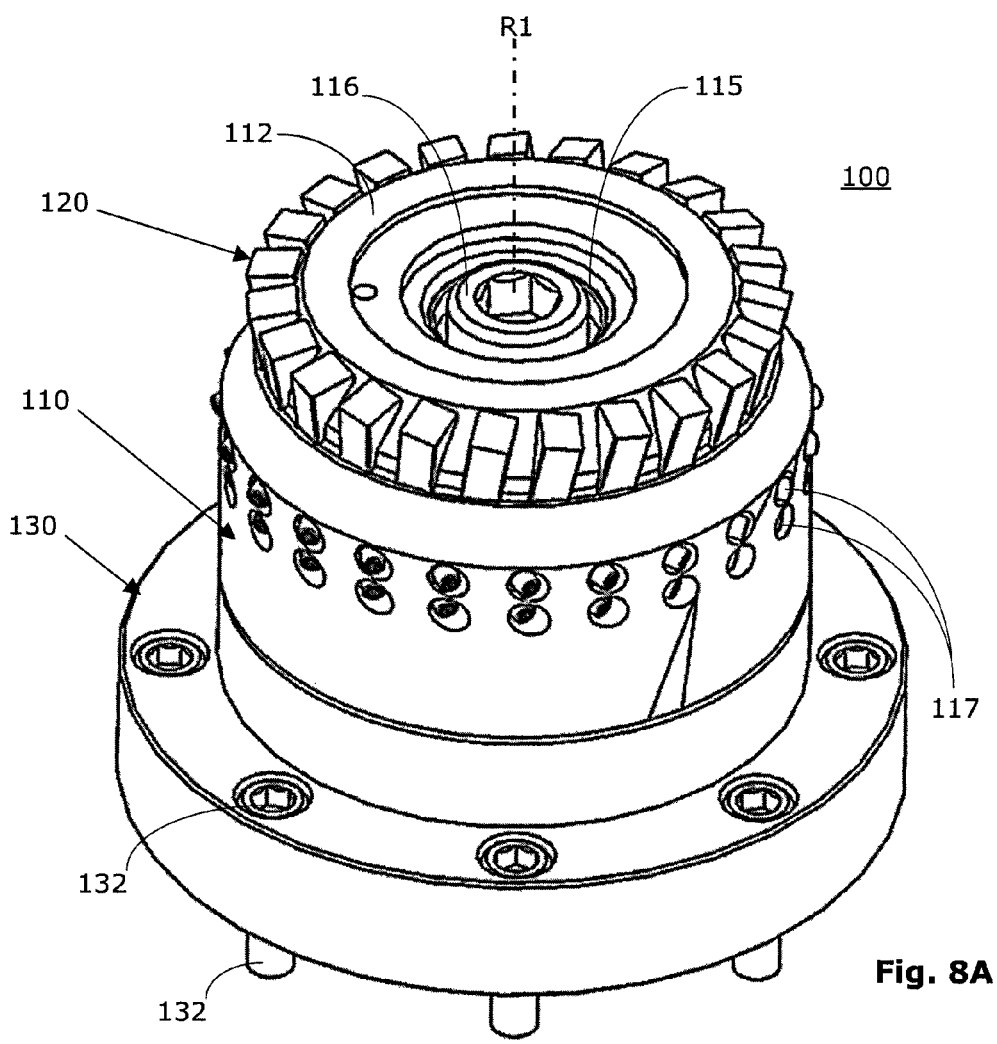
FIG. 8A is a top perspective view of an embodiment of a skiving tool.
Figure 8B:
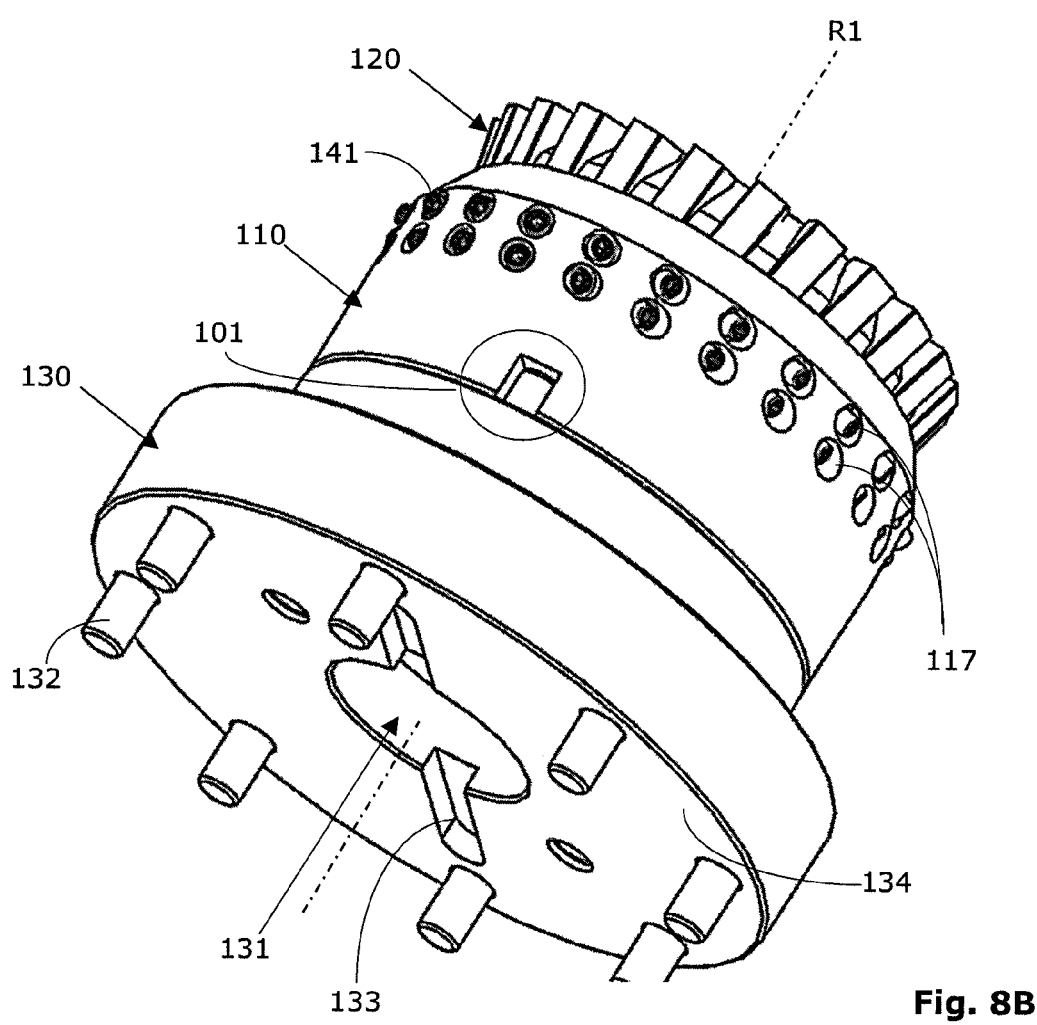
FIG. 8B is a side perspective view of the skiving tool of FIG. 8A.
Figure 8C:
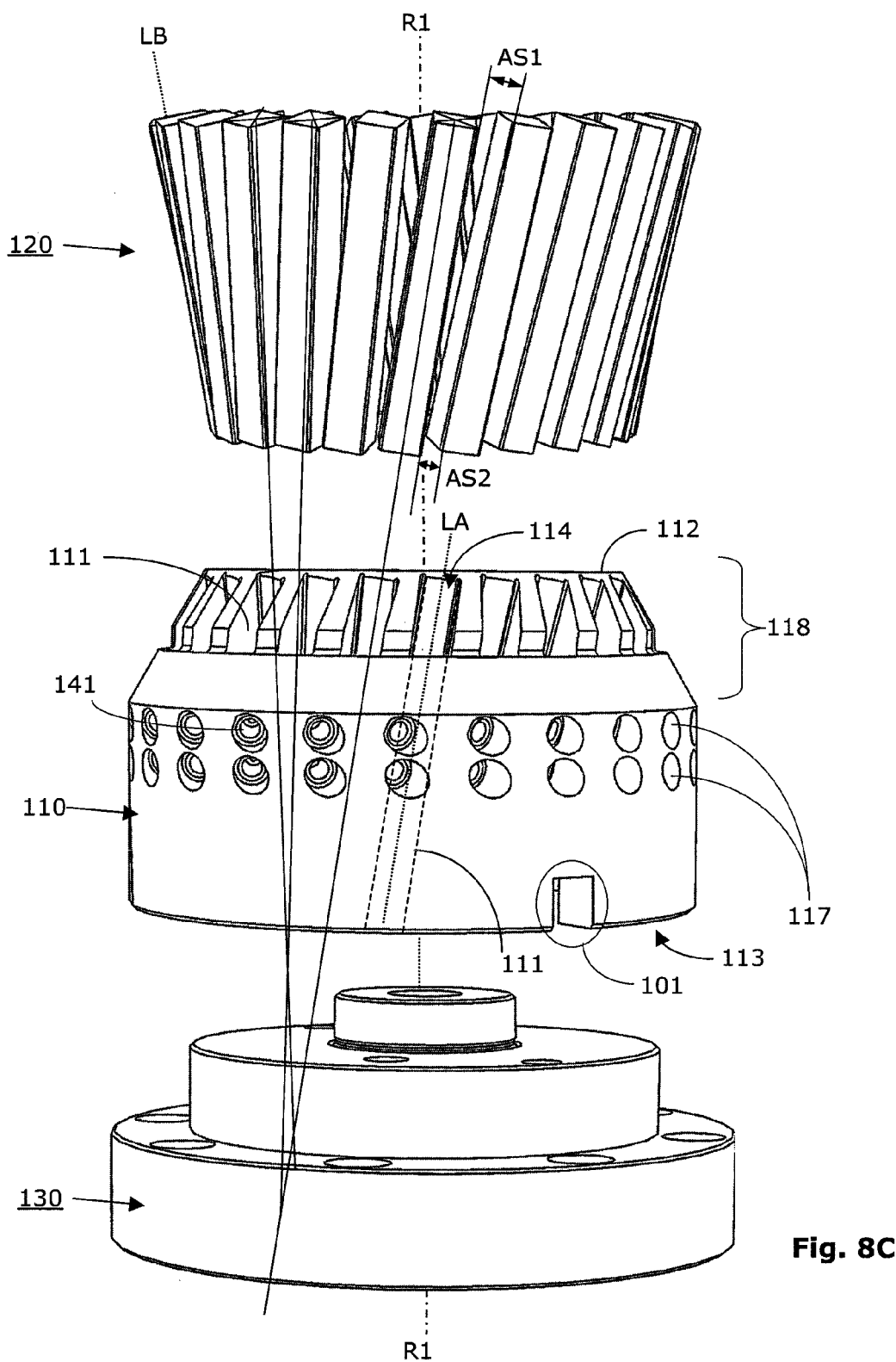
FIG. 8C is an exploded view of the skiving tool of FIG. 8A.

In FIGS. 8A-8C, another embodiment of a skiving tool 100 is shown in different views. Further, basic aspects of the skiving tool 100 are described on the basis of these drawings.

Figure 1:
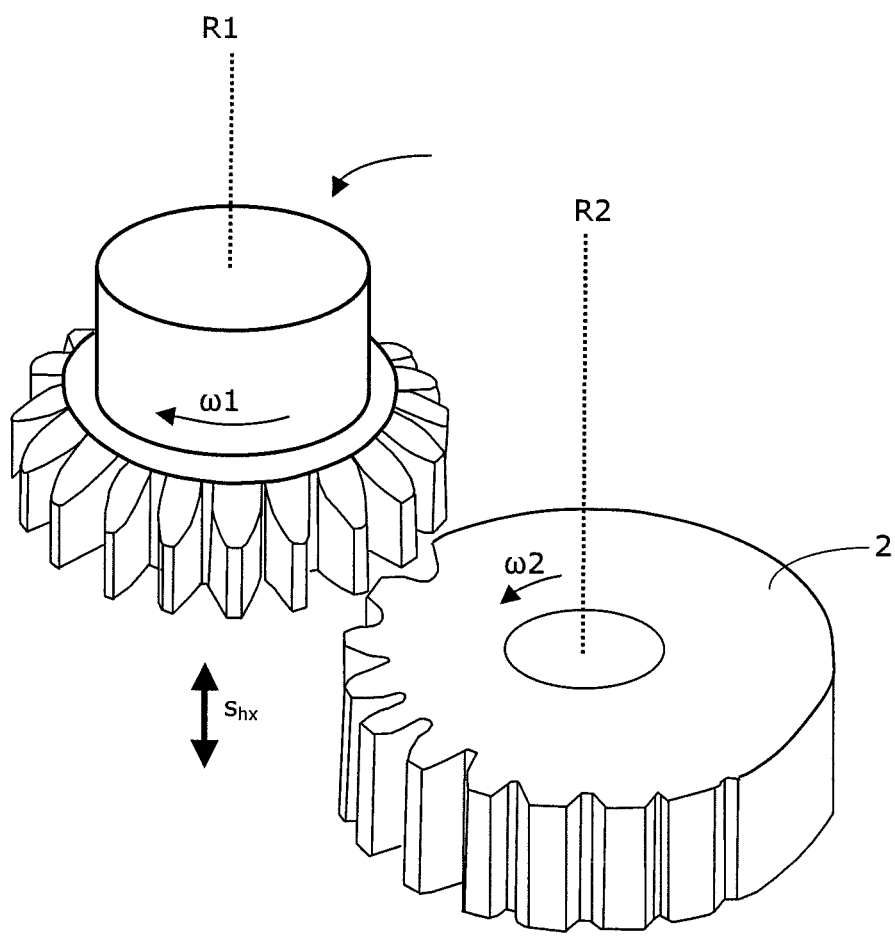
FIG. 1 is a schematic representation of a prior art shaping wheel having a cylindrical outer contour in engagement with an outer-toothed work piece during gear shaping.
Figure 2:
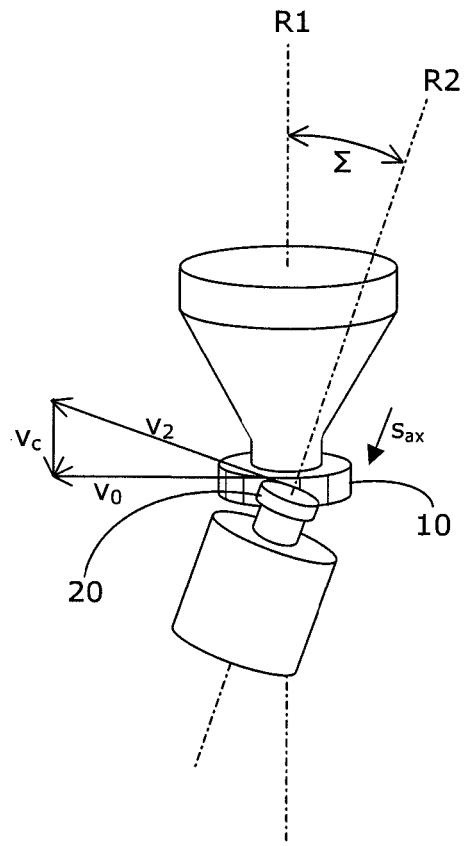
FIG. 2 is a schematic representation of a prior art straight-toothed skiving wheel having a cylindrical outer contour in engagement with an outer-toothed work piece during power skiving.
Figure 3:
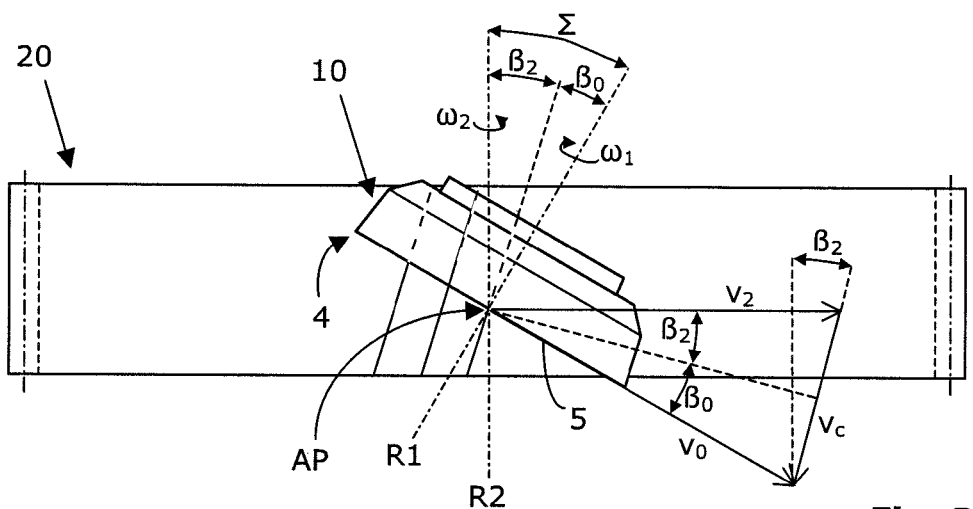
FIG. 3 is a schematic representation of a prior art helically toothed skiving wheel having a conical outer contour in engagement with an outer toothed work piece during the power skiving.
Figure 4A:
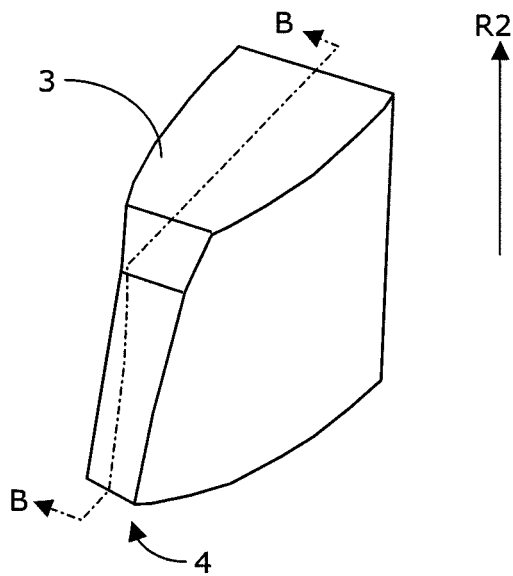
FIG. 4A is a perspective view of a single cutting tooth of a prior art skiving wheel having a conical outer contour.
Figure 4B:
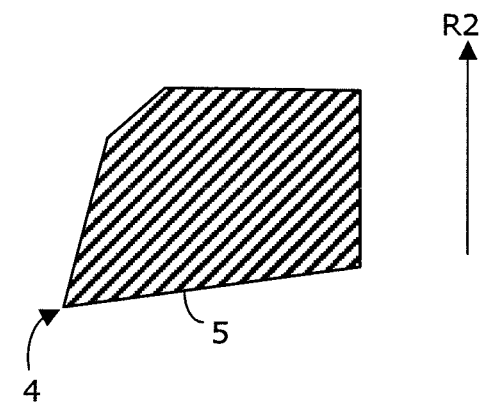
FIG. 4B is a sectional view along the line B-B sectioning the cutting tooth of FIG. 4A.
Figure 4C:
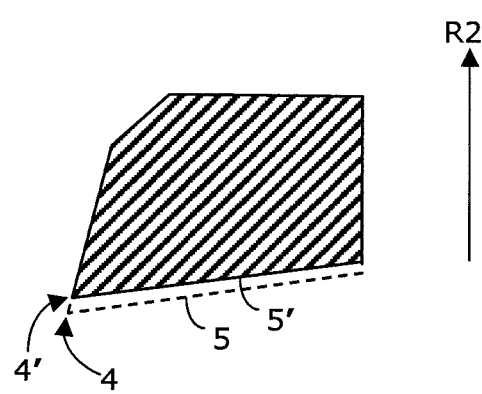
FIG. 4C is a sectional view along the line B-B sectioning the cutting tooth of FIG. 4A after the cutting tooth has been reground on the tooth breast.

In some embodiments, the skiving tool 100 is designed for manufacturing a rotationally symmetrical periodical structure on a work piece 20, such as in a constellation as shown in FIG. 2, via a power skiving method. The skiving tool 100 comprises a cylindrical and/or cone-shaped base body 110 comprising a central rotation axis R1. The base body 110 has a plurality of receiving openings 111. In FIGS. 8A-8C, a configuration is shown in which all of the receiving openings 111 are each equipped with one cutter bar 120. In FIGS. 8A-8C, 23 receiving openings 111 receive 23 cutter bars 120.

In some embodiments, each receiving opening 111 receives a cutter bar 120. If there are fewer cutter bars 120 than receiving openings 11, then only some of the receiving openings 111 receive the cutter bars 120.

On the basis of FIG. 8C it can be recognized indicatively that each of the receiving openings 111 has an elongate shape having a longitudinal axis LA. In FIG. 8C, a receiving opening 111 is indicated by a dotted line. The longitudinal axis of this one receiving opening 111 is also shown. It can be recognized that this one receiving opening 111 extends starting from the insert opening 114 at the front surface 112 on the side of the work piece obliquely into the interior of the base body 110.

In certain embodiments, the so-called "active head sections" of the cutter bars 120 project radially inclined out of the base body 110 of the skiving tool 100 on the front face or in the truncated-cone-shaped section. The active head section of the cutter bars 120 comprises the tooth breast 125 and the cutting edges, which are formed by two edges of the cutter bars 120. It should be noted that the cutter bars 120 are shown in these drawings without a concrete cutting edge geometry. The cutter bars 120 may be fixed in the receiving openings 111 such that they project at least partially radially, in order to be able to plunge through the gaps on the work piece 20 free of collisions.

In some embodiments, the active head section of the cutter bars 120 projects at least a couple millimeters out of the base body 110. The cutter bars 120 project a certain distance in millimeters, depending on the toothing module on the work piece 20 and the chosen kinematic. That is, the spacing is greater than the tooth height plus a value for the adaptation to the kinematics plus a safety value.

Figure 9:
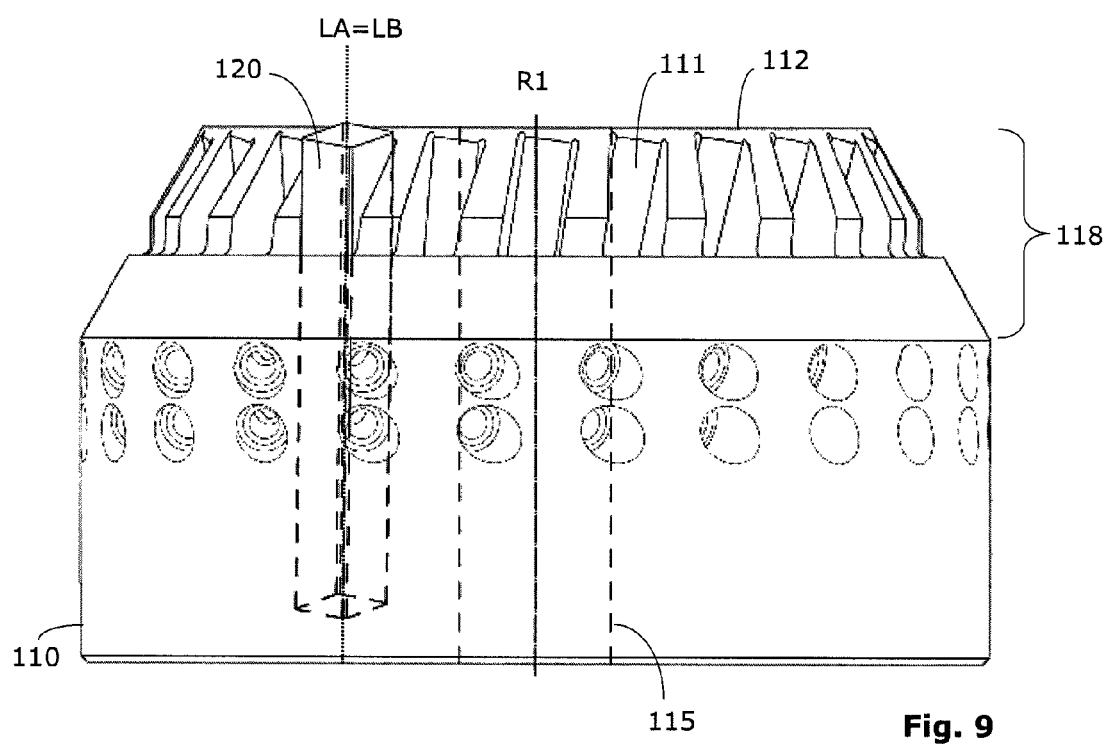
FIG. 9 is a side view of the base body of the skiving took of FIG. 8A, comprising a cutter bar.

In FIG. 9, the mantle shape of the base body 110 is shown in a schematic side view. The illustrated base body is shown with only one cutter bar 120. The portion of the cutter bar 120 that is visible because it projects from the front surface 112 on the side of the work piece respectively from the conical section of the end piece 118 of the base body 110 is shown with a solid line. The "invisible" or "hidden" portion of the cutter bar 120 that sits in the interior of the base body 110 in a corresponding receiving opening 111, is shown with a broken or hidden line. In the interior of the base body 110, the receiving opening 111 has a shape that corresponds approximately to the shape of the (non-visible) portion of the cutter bar 120 therein.

In some embodiments, the receiving openings 111 are implemented complementary to the cutter bars 120. If the cutter bars 120 have a shaft having a rectangular cross section, as shown in the FIGS. 8A-8C, then the receiving openings 111 also have a rectangular cross section. If the cutter bars 120 have a shaft having a square cross section, as shown in the FIGS. 14A-14C, then the receiving openings 111 also have a square cross section.

In some embodiments, the receiving openings 111 may be implemented as blind holes, which extend from the end piece 118 of the base body 110 into the interior of the base body 110. In other embodiments, the receiving openings 111 may also be implemented as through borings, which have openings both in the area of the end piece 118 and also in the rearward section 113. Only receiving openings which are implemented as through borings, are shown in the drawings.

Figure 10:
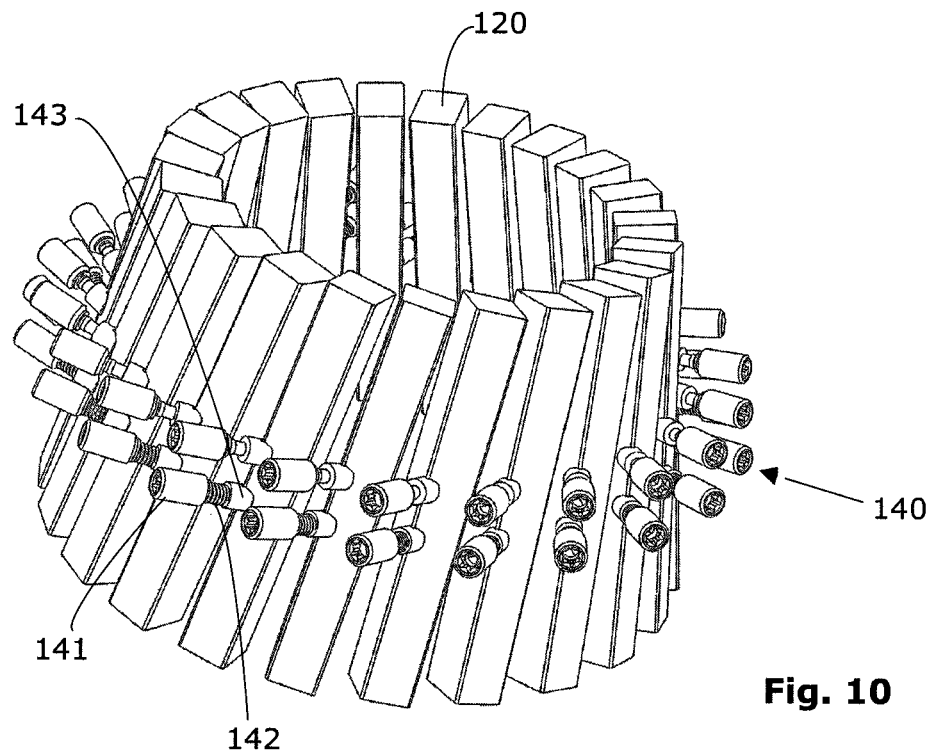
FIG. 10 is a side perspective view of a spatial arrangement of the cutter bars of an embodiment of a skiving tool together with mounting means.
Figure 11:
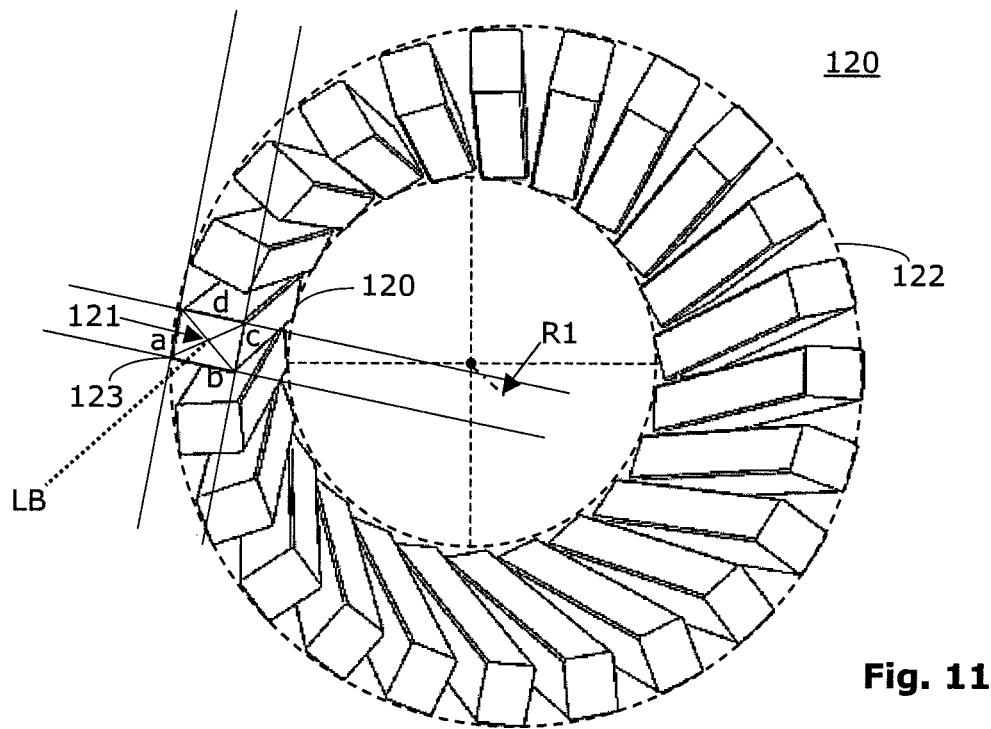
FIG. 11 is a bottom perspective view of a spatial arrangement of the cutter bars of an embodiment of a skiving tool.

In some embodiments, the receiving openings 111 are inclined relative to the central rotation axis R1, whereby in the end the position of the receiving openings 111 depends from the kinematic and the inclination angle of the components. It should be noted that the longitudinal axes LA of the receiving openings 111 extend may skew with respect to the central rotation axis R1 and serve as generator straight lines of a rotation hyperboloid, as shown in FIGS. 8C, 9, 10, 11 and 14A-14C. In FIG. 8C, the longitudinal axis LB of a cutter bar 120 is shown on the left-hand side in the upper section of the drawing. In FIG. 9, the longitudinal axis LB of a cutter bar 120 is shown. A further longitudinal axis LB of a cutter bar 120 is shown in FIG. 11.

As shown, the receiving openings 111 are arranged on the base body 110 uniformly about the central rotation axis R1.

In some embodiments, as shown in FIGS. 8A-8C and FIG. 9, the longitudinal axes LA of the receiving openings 111 lie further apart in the section of the end piece 118 of the base body 110 than in a rearward section 113 of the base body 110. In the embodiments of the FIGS. 8A-8C and FIG. 9, directly adjacent receiving openings 111 have a minimum distance AS1 in the section of the end piece 118, which is greater than the minimum distance AS2 in the rearward section 113 of the base body 110, as indicated in FIG. 8C.

Respective directly adjacent receiving openings 111 are separated from each other by material, such as a metal, of the base body 110. In the embodiments of FIGS. 8A-8C and FIG. 9, the material between two directly adjacent receiving openings 111 in the rearward section 113 of the base body 110 has a lower material strength than in the section of the end piece 118. Although this aspect cannot be recognized in the drawings, it follows, however, from the arrangement of the cutter bars 120 and the constructional shape of the base body 110 of these embodiments.

However, the longitudinal, axes LA of the receiving openings 111 and the longitudinal axes LB of the cutter bars 120 may also be arranged according to the other constellations shown in FIGS. 6A-6F. The receiving openings 111 have a spatial arrangement where the longitudinal axes LA are the generators and the same rotation hyperboloid its degenerations, as has been explained with reference to the FIGS. 6A-6F.

In addition, the cutter shafts of the cutter bar 120 can optionally also be rotated about their longitudinal axes LB, which is expressed by the axial rotation angle alphaA. In relation with the FIGS. 6A-6F, these angles have already been explained on the basis of concrete numerical data examples.

In some embodiments, the receiving openings 111 are rotated slightly about the value of the axial rotation angle alphaA, so as to accommodate the cutter bars 120 in the base body 110 without collisions.

The described implementation of the arrangement, as shown in the FIGS. 8A-8C, 9, 10, 11, and 14A-14C, achieve favorable grinding conditions when regrinding the cutter bars 120 at the tooth breast 125. This is because the cutter bars 120 can actually be reground in a grinding machine.

In the following paragraphs, further details are described, that may be applied in the different embodiments as desired or needed.

In the FIGS. 8A-8C it is shown that the skiving tool 100 may comprise an adapter 130 in addition to the base body 110. The adapter 130 is designed such that it is suitable for connecting the skiving tool 100 with a tool spindle (not shown) of a power skiving machine (not shown). The tool spindle may penetrate with a punch-type end piece from the rear into a central bore 131 of the adapter 130, which is shown in FIG. 8B. For example, a screw 116 may be screwed through an according central bore 115 of the base body 110 from the front surface 112 of the end piece 118 of the base body 110 on the work piece side through to an inner thread of the tool spindle so as to fix the skiving tool 100 to the tool spindle.

Additionally, or alternatively, the adapter 130 can be put planely on a counter surface of the tool spindle and can be fixed to the tool spindle using screws 132. In FIG. 8B, eight of such screws 132 are shown in total.

Additionally, or alternatively, the screw 116 may fix the base body 110 to the adapter 130, while the screws 132 fix the adapter 130 to the tool spindle, as shown in FIGS. 8A-8C.

In some embodiments, an anti-twist protection 101 is provided on the base body 110 with respect to the adapter 130 (see FIG. 8B), such that the base body 110 can be fixed form-fittingly to the adapter 130.

Additionally, or alternatively, the adapter 130 may comprise on its rear side 134 means 133 for form-fittingly connecting the skiving tool 100 with the tool spindle. For example, radially extending grooves 133 may serve as means for the form-fitting connection, as shown in FIG. 8B.

In some embodiments, one or two through borings 117 are provided in the mantle surface of the base body 110 for each cutter bar 120. These through borings 117 are designed to fix the cutter bars 120 in the base body 110. Fixing means 140 for each through boring 117 are applied, each comprising a threaded pin 141, a compression spring 142 and a compression piece 143. Several of such fixing means 140 are shown in FIG. 10 in an exploded view. After the insertion of a cutter bar 120 into the corresponding receiving opening 111 of the base body 110, a compression piece 143, a compression spring 142 and a threaded pin 141 are inserted in the corresponding through boring 117. By tightening the threaded pin 141, a compressive force is exerted on the cutter bar 120 via the compression spring 142 and the compression piece 143 to fixedly press this against at least one surface of the corresponding receiving opening 111 in order to thus fix the position of the cutter bar 120 in the base body 110.

The end piece 118 of the skiving tool 100 may be conical, as can be seen in the FIGS. 8A-8C and 9. The conical end piece 118 prevents collision with the work piece 20.

Figure 16:
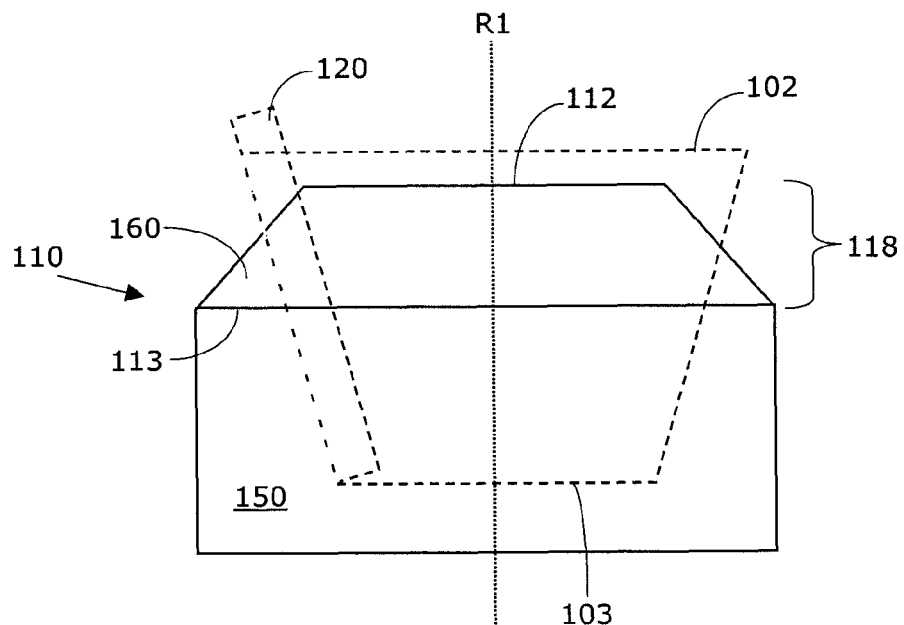
FIG. 16 is a side view of a mantle-shaped base body together with a mantle-shaped cutter bar showing a single cutter bar.

In some embodiments, the skiving tool 100 has a mantle shape, which is composed of a cylindrical portion 150 and a cone shaped portion 160, as shown in the schematic representation of FIG. 16. The position of the cutter bars 120 is also indicated in FIG. 16 by a truncated-cone-shaped mantle surface 102. This cone-shaped mantle surface 102 is an exemplary constellation of the cutter bars 120, corresponding to the constellations shown in the FIGS. 8A-8C and FIG. 9. It should be noted that in these embodiments, the conical portion 160 of the base body 110 is directed opposite to the truncated-cone-shaped mantle surface 102.

The truncated cone is a rotational body, which is defined by a cover on the one side and by a base on the opposite side. The cover of the truncated-cone-shaped base body 160 corresponds to the front face 112 of the end piece 118, and the base corresponds either to the connection surface, i.e., it corresponds to the rear-side section 113 herein, for connection with a tool spindle or for connection with an adapter 130.

Figure 17:
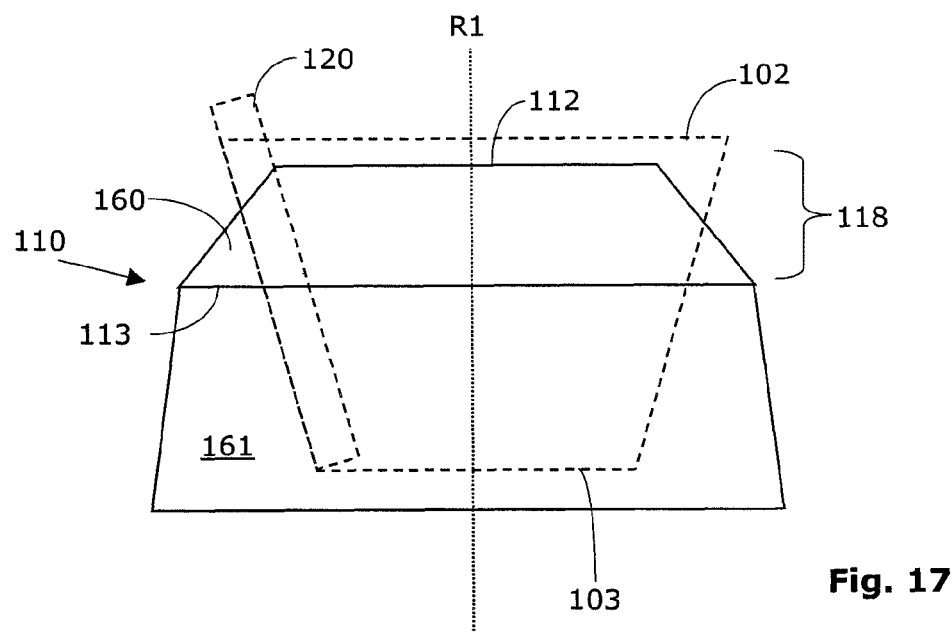
FIG. 17 is a side view of another mantle-shaped base body together with a mantle-shaped cutter bar showing single cutter bar.

The skiving tool 100 may also have a mantle shape, which is composed of one or more truncated-cone-shaped sections 160, 161, as shown in FIG. 17. In FIG. 17, the position of the cutter bars 120 is again represented by an exemplary truncated-cone-shaped mantle surface 102. This truncated-cone-shaped mantle surface 102 describes in a simple form the constellation of the cutter bars 120 in this embodiment. Alternatively, however, the skiving tool 100 can be composed of two cylinder elements. The arrangements shown in FIGS. 16 and 17 can be applied to all embodiments and constellations of the cutter bars 120.

FIGS. 10 and 11 show further optional spatial arrangements of the cutter bars 120 without showing the remaining elements of the corresponding skiving tools 100. In FIG. 11, plural auxiliary lines are overlaid on one of the cutter bars 120 to assist in describing the position and orientation of the cutter bars 120. The longitudinal axis LB of the cutter bars 120 may coincide with the longitudinal axis LA of the receiving openings 111, as shown in FIG. 9 by the indication LA=LB.

The longitudinal axis LB of a cutter bar 120 runs through the intersection point of the diagonals of a front section of the cutter bar 120. In FIG. 11, two diagonals and their intersection point are shown on the tooth breast 125. Here, the tooth breast 125 has a rectangular shape and is defined by the edges a, b, c and d. The edges a and c as well as the edges b and d respectively lie opposite to each other and run generally parallel to each other. The following holds for a cutter bar 120 having a rectangular shape, a=c and b=d, wherein a≠b. The following holds for a cutter bar 120 having a square front section (cross section), a=b=c=d.

The spatial arrangement of the cutter bars 120 is explained further on the basis of a series of drawings shown in FIGS. 12A-14C. In these drawings, exemplary cutter bars 120 are shown having a square cross section with a=b=c=d. In some such embodiments, the length LS of the cutter bars 120 is about 60 mm. The number of the cutter bars 120 is 23 here.

Figure 12A:
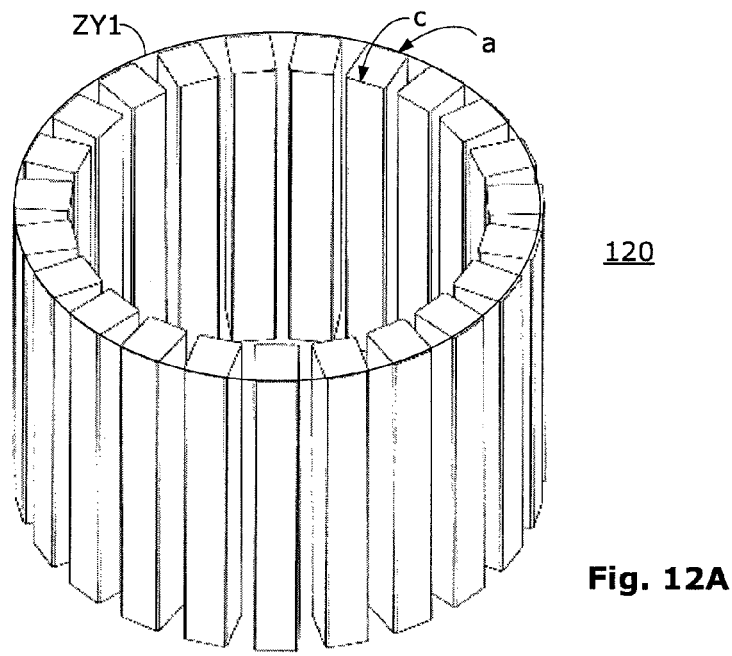
FIG. 12A is a perspective view of a cylindrical arrangement of cutter bars.
Figure 12B:
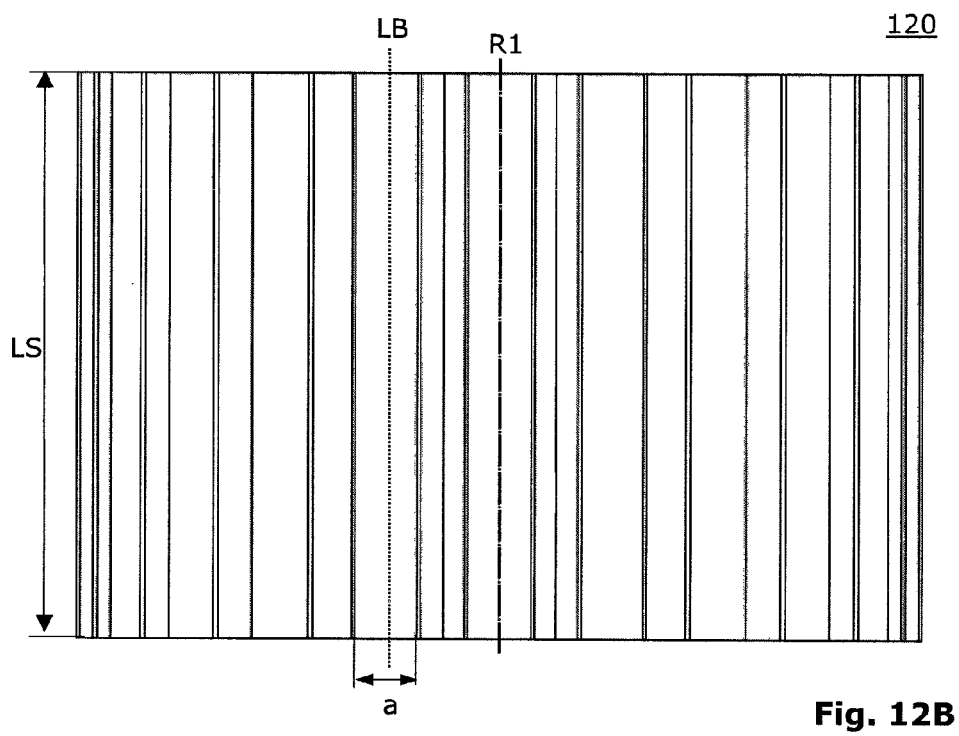
FIG. 12B is a side view of the cylindrical arrangement of the cutter bars of FIG. 12A.
Figure 12C:
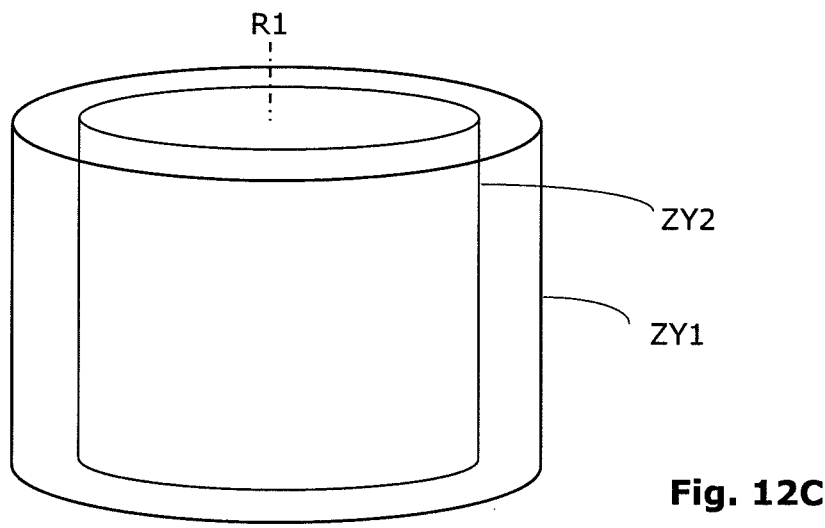
FIG. 12C is a side perspective view of a base body corresponding with the cylindrical arrangement of FIG. 12A.

In FIGS. 12A and 12B, a constellation with the followings angles is shown: alphaA=0 degrees, alphaH=0 degrees and alphaC=0 degrees. In this degenerated form of a rotation hyperboloid, the longitudinal axes LB of the cutter bars 120 run parallel to the rotation axis R1. This constellation can be described by two cylinder surfaces ZY1, ZY2, which are shown in FIG. 12C. The edges "a" form secants on the outer cylinder surface ZY1 therein and the edges "c" form secants on the inner cylinder surface ZY2 therein.

Figure 13A:
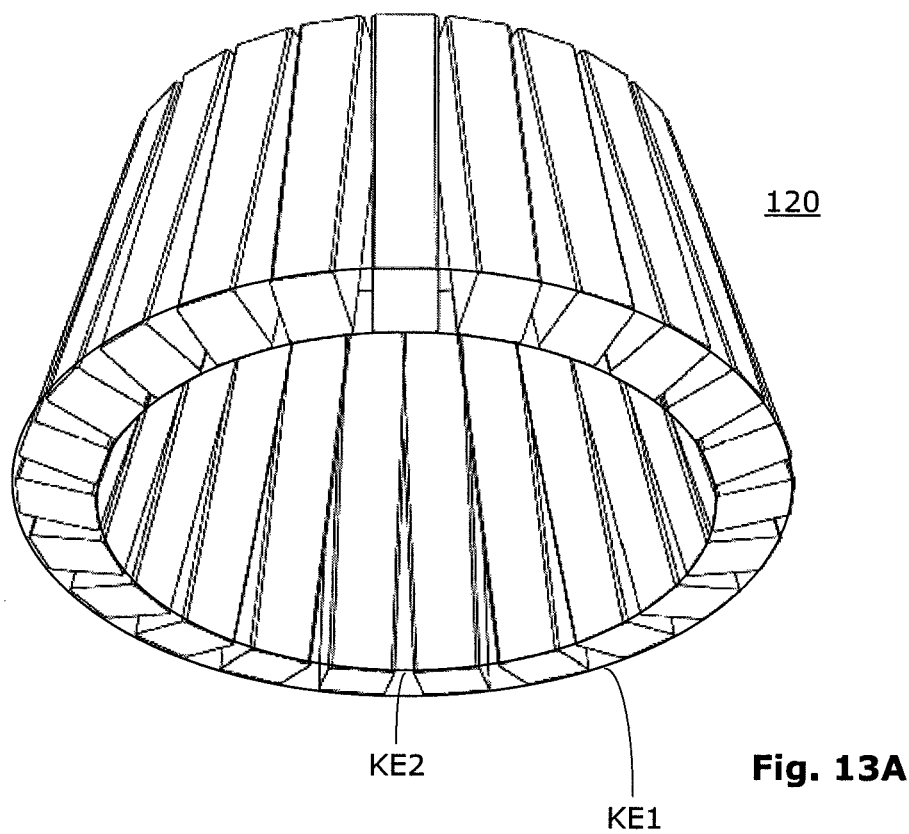
FIG. 13A is a bottom perspective view of a conical arrangement of the cutter bars.
Figure 13B:
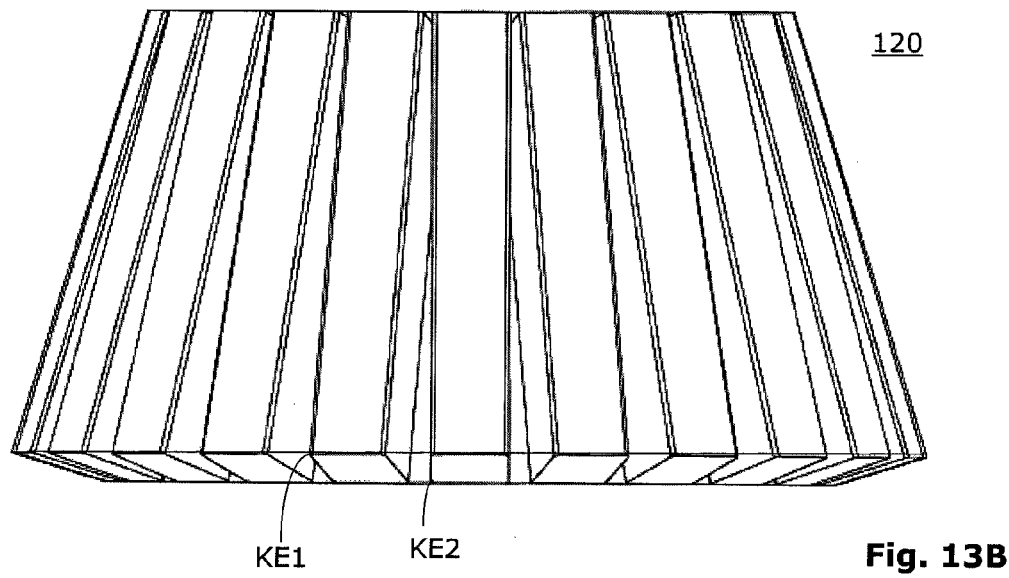
FIG. 13B is a side view of the conical arrangement of the cutter bars of FIG. 13A.
Figure 13C:
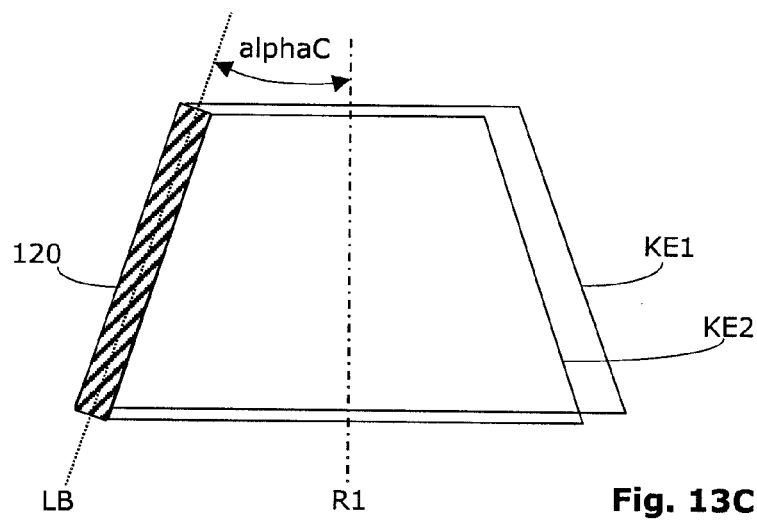
FIG. 13C is a cross-sectional view of the base body corresponding with the conical arrangement of FIG. 13A with one cutter bar per cross section.

In the FIGS. 13A and 13B, a constellation with the followings angles is shown: alphaH=0 degrees and alphaC=20 degrees. Another degenerated form of a rotation hyperboloid is thus shown. In this case, the longitudinal axes LB of the cutter bars 120 run obliquely to the rotation axis R1. The cutter bars 120 are tilted here (i.e. arranged conically), though not twisted in themselves, i.e., the twist angle alpha=0 degrees. This constellation can be described by two cone surfaces KE1, KE2, which are shown in FIG. 13C in a sectional representation. The edges "a" form secants on the outer cone surface KE1 thereby and the edges "c" form secants on the inner cone surface KE2 thereby. Due to the tilt of the cutter bars 120, the two cone surfaces KE1, KE2 are slightly offset (shifted) with respect to each other in the axial direction, as can be recognized in FIG. 13C. In FIG. 13C, the position of one cutter bar 120 is shown in the section, the longitudinal axis LB of which together with the rotation axis R1 lie together in the plane of the drawing. A constellation as shown in the FIGS. 13A and 13B may be used in all embodiments.

Figure 14A:
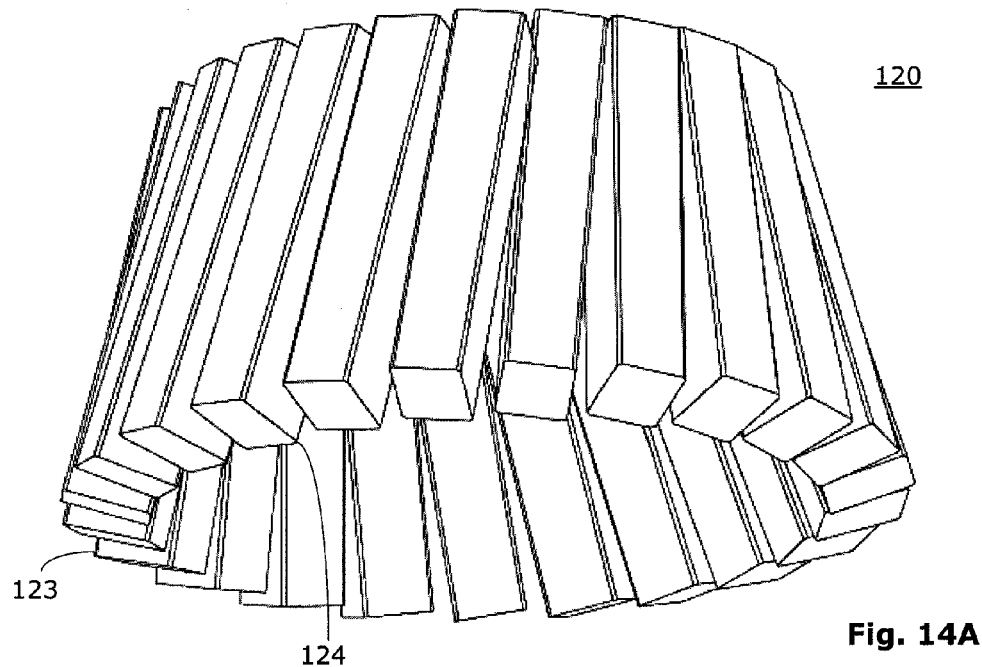
FIG. 14A is a perspective view of a hyperboloid-shaped arrangement with tilted cutter bars.
Figure 14B:
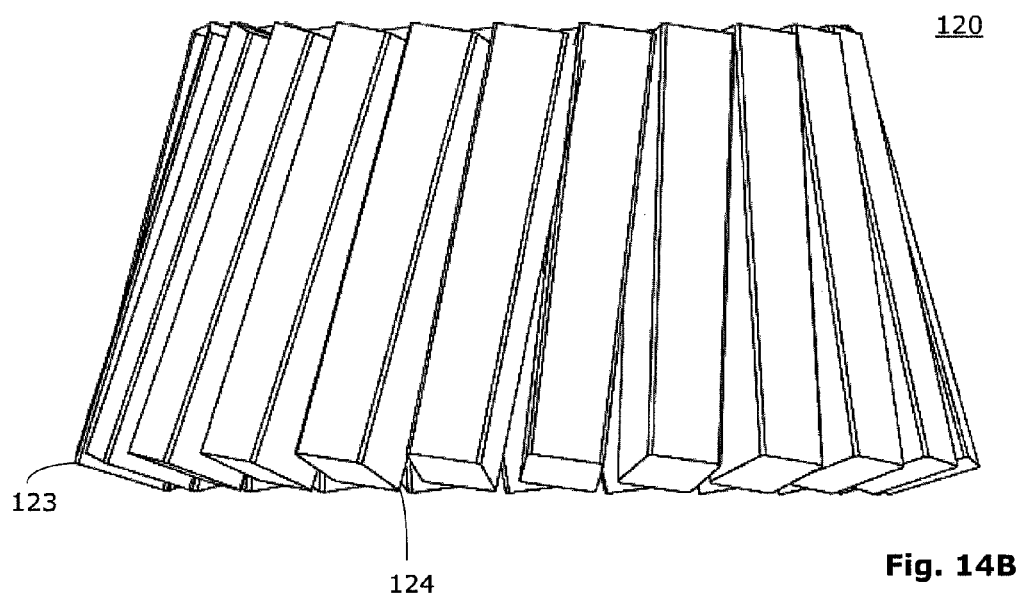
FIG. 14B is a side view of the hyperboloid-shaped arrangement with tilted cutter bars of FIG. 14A.

In the FIGS. 14A and 14B, a constellation with the followings angles is shown: alphaH=10 degrees and alphaC=20 degrees. The twist angle alpha is different from zero degree. In this case, the longitudinal axes LB of the cutter bars 120 run skew to the rotation axis R1 and the cutter bars 120 are slightly twisted in themselves. This constellation can be described by a rotation hyperboloid here. The radii of these constellations are slightly greater than for the truncated-cone-shaped case shown in FIG. 13C, because respective corners of a cutter bar 120 are twisted further outward than in FIG. 13C. In FIG. 13C, the edges "a" and "c" form secants to the corresponding conical surfaces KE1, KE2. In the FIGS. 14A-14C, the radii are defined respectively by the corners 123 (defined by the edges "a" and "d") that are located furthest radially outwardly and by the corners 124 (defined by the edges "b" and "c") that are located furthest radially inwardly.

Figure 14C:
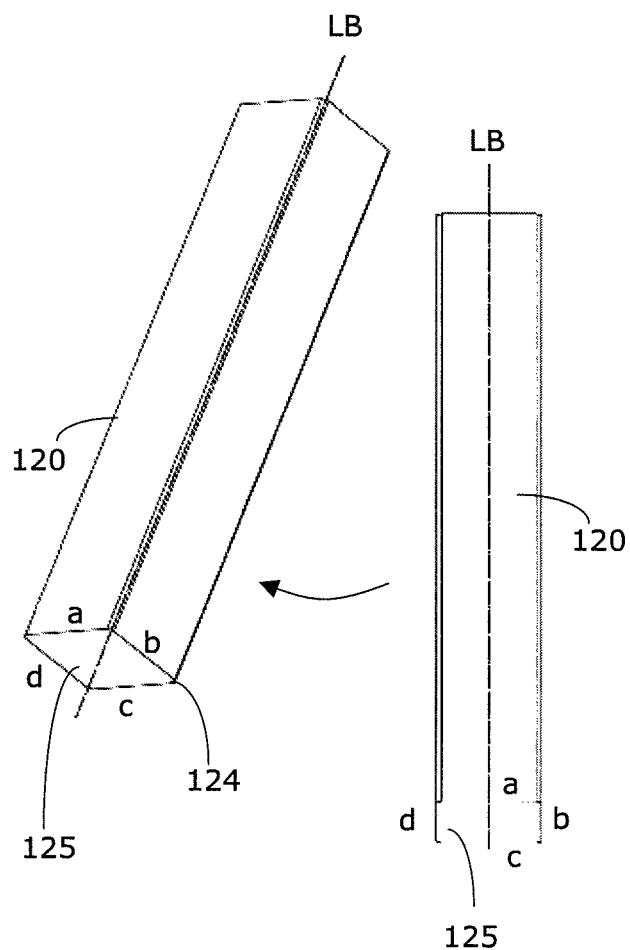
FIG. 14C is a schematic view of a cutter bar prior to and after tilting.

In FIG. 14C, the transformation is represented schematically of a cutter bar 120 that is only tilted (here with alphaC=20 degrees) (shown on the right-hand side in FIG. 14C) to a cutter bar 120 that is tilted and twisted (shown on the left-hand side in FIG. 14C). Since the cutter bar 120 (shown on the right-hand side in FIG. 14C) is tilted to the front, one can recognize the tooth breast 125 with all the four edges "a", "b", "c" and "d" in the frontal view. The tilted and twisted cutter bar 120 (shown on the left-hand side in FIG. 14C) is described by the angles alphaA=4.5 degrees, alphaH=10 degrees and alpha.C=20 degrees. A constellation as shown in the FIGS. 14A and 14B may be applied in all embodiments.

Figure 15:
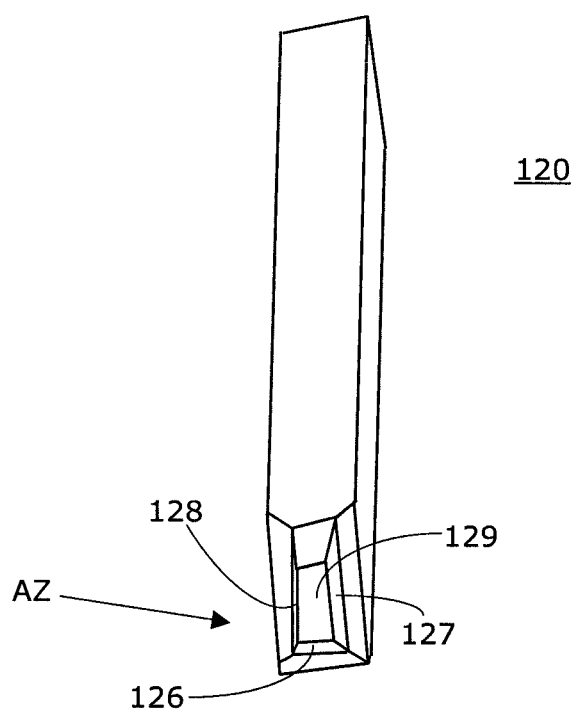
FIG. 15 is a perspective view of an embodiment of a cutter bar having cutting edges and chip surfaces.

The cutting edges of the skiving tools 100 may differ depending on the embodiments. For example, they may run along the contour line of the tooth breast 125. In FIG. 15, an exemplary cutter bar 120 having a concretely formed active zone AZ is shown. Here, the active zone AZ comprises a chip surface 126, a first relief surface 127, a second relief surface 128 and a head relief surface 129. FIG. 15 shows how the tooth breast 125 of a cutter bar 120 may be ground in order to provide the required cutting edges and surfaces.

When frontally regrinding the cutter bars 120, the head circle diameter of the tool 100 decreases if one clamped the cutter bars 120 after the regrinding exactly as deep into the receiving openings 110 as before the regrinding. However, the cutter bars 120 may be clamped less deeply into the receiving openings 111 after the regrinding, in order to compensate for the relocation of the tooth breast 125, i.e., to compensate for the relocation of the chipping, head and relief surfaces 126-129 and to keep the head circle diameter constant.

In some embodiments, the receiving openings 111 have a length parallel to the longitudinal axis LA, which may be between about 50 mm and about 100 mm. However, the actual length is depending on the module, and may also assume other values.

The power skiving process with the skiving tool of the present invention can be applied dry or wet. The work piece 20 may be pre-toothed (e.g. a roughly toothed work piece) or may be untoothed. For an untoothed work piece, the skiving tool 100 works into the full, i.e., solid, material. The work piece 20 may be machine finished, for example, by application of a finishing (planishing) method. In some embodiments, the cutter bars 120 of the skiving tool 100 or at least the cutting edges of the cutter bars 120 are manufactured from a hard metal.

As may be recognized by those of ordinary skill in the pertinent art based on the teachings herein, numerous changes and modifications may be made to the above-described and other embodiments of the present invention without departing from the scope of the invention as defined in the claims.

What is claimed is:

1. A skiving tool for manufacturing a rotationally symmetrical periodical structure on a work piece via a skiving method, comprising:
   a base body defining a central rotation axis and including a plurality of receiving openings arranged substantially uniformly around the central rotation axis, each receiving opening defining an elongate shape and a longitudinal axis; and
   a plurality of cutter bars, less than or equal to the plurality of receiving openings;
   wherein the longitudinal axes of the receiving openings substantially define a rotation hyperboloid or a degenerated rotation hyperboloid arranged rotationally symmetrical to the central rotation axis;
   wherein the base body further comprises at least one truncated-cone-shaped section and the plurality of receiving openings open out to a conical area of the at least one truncated-cone-shaped section; and
   wherein at least one of (1) the at least one truncated-cone-shaped section comprises two truncated-cone-shaped sections and (2) the base body further comprises a cylindrical body.

2. A skiving tool according to claim 1, further comprising an adapter, configured to fix the skiving tool to a tool spindle.

3. A skiving tool according to claim 1, wherein the base body further includes one or two through borings per receiving opening, each through boring extending from an exterior of the base body to its respective receiving opening.

4. A skiving tool according to claim 3, further comprising fixing means for each through boring, said fixing means including a threaded pin, a pressure spring and a pressure piece.

5. A skiving tool according to claim 1, wherein each receiving opening defines a length parallel to the longitudinal axis thereof between about 50 mm and about 100 mm.

6. A skiving tool according to claim 1, wherein a first minimum distance between directly adjacent receiving openings at a front face of a work piece side of the base body is greater than a second minimum distance between said adjacent receiving openings at a rear-side of the base body.

7. A skiving tool according to claim 1, wherein a first minimum distance between directly adjacent receiving openings at a front face of a work piece side of the base body is greater than a second minimum distance between said adjacent receiving openings at a rear-side of the base body.

8. A skiving tool according to claim 1, wherein material between directly adjacent receiving openings at a rear-side of the base body has a lower material strength than material between said adjacent receiving openings at a front face of a work piece side of the base body.

9. A skiving tool according to claim 1, wherein material between directly adjacent receiving openings at a rear-side of the base body has a lower material strength than material between said adjacent receiving openings at a front face of a work piece side of the base body.

10. A skiving tool according to claim 1, wherein the rotation axis of the base body coincides with a central z-axis of said rotation hyperboloid or said degenerated rotation hyperboloid.

11. A skiving tool according to claim 1, wherein the rotation axis of the base body coincides with a central z-axis of said rotation hyperboloid or said degenerated rotation hyperboloid.

12. A skiving tool according to claim 1, wherein for each longitudinal axis, an intersection angle between said longitudinal axis and the rotation axis is between about −45 degrees and about 45 degrees.

13. A skiving tool according to claim 12, wherein said intersection angle is between about −40 degrees and about 40 degrees.

14. A skiving tool according to claim 1, wherein for each longitudinal axis, an intersection angle between said longitudinal axis and the rotation axis is between about −45 degrees and about 45 degrees.

15. A skiving tool according to claim 14, wherein said intersection angle is between about −40 degrees and about 40 degrees.

16. A skiving tool according to claim 1, wherein said rotation hyperboloid or said degenerated rotation hyperboloid is other than a circular cylinder.

* * * * *